(12) United States Patent
Akiyama

(10) Patent No.: US 11,561,958 B2
(45) Date of Patent: Jan. 24, 2023

(54) INFORMATION PROCESSING DEVICE AND INFORMATION PROCESSING SYSTEM

(71) Applicant: FUJITSU LIMITED, Kawasaki (JP)

(72) Inventor: Takashi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/156,673

(22) Filed: Jan. 25, 2021

(65) Prior Publication Data

US 2021/0326323 A1 Oct. 21, 2021

(30) Foreign Application Priority Data

Apr. 20, 2020 (JP) .............................. JP2020-074859

(51) Int. Cl.
| | | |
|---|---|---|
| *G06F 16/00* | (2019.01) | |
| *G06F 16/23* | (2019.01) | |
| *G06F 16/27* | (2019.01) | |
| *G06F 16/22* | (2019.01) | |
| *G06F 16/21* | (2019.01) | |

(52) U.S. Cl.
CPC ........ *G06F 16/2358* (2019.01); *G06F 16/219* (2019.01); *G06F 16/22* (2019.01); *G06F 16/2308* (2019.01); *G06F 16/273* (2019.01)

(58) Field of Classification Search
None
See application file for complete search history.

(56) References Cited

U.S. PATENT DOCUMENTS

| | | | |
|---|---|---|---|
| 6,301,589 B1 | 10/2001 | Hirashima et al. | |
| 6,738,748 B2 * | 5/2004 | Wetzer | G07C 5/006 705/7.14 |
| 7,647,344 B2 * | 1/2010 | Skurtovich, Jr. | G06Q 40/02 707/999.107 |
| 7,783,610 B2 * | 8/2010 | Lin | G06F 16/2343 709/219 |
| 7,804,982 B2 * | 9/2010 | Howard | G06F 16/93 382/117 |
| 7,962,458 B2 * | 6/2011 | Holenstein | G06F 11/2094 707/704 |
| 10,909,143 B1 * | 2/2021 | Brahmadesam | G06F 16/2228 |
| 2002/0107877 A1 | 8/2002 | Dilatush et al. | |
| 2021/0064590 A1 * | 3/2021 | Venkatesh | G06F 16/93 |

FOREIGN PATENT DOCUMENTS

| | | |
|---|---|---|
| JP | H10-49416 A | 2/1998 |
| JP | H11-167510 A | 6/1999 |

\* cited by examiner

*Primary Examiner* — Jean M Corrielus
(74) *Attorney, Agent, or Firm* — Fujitsu Patent Center

(57) ABSTRACT

An information processing device includes a memory, and a processor coupled to the memory and configured to acquire a plurality of data from first databases, where the data are stored in the first databases in a first period, and identifiers are stored in the first databases in association with the data, where the first databases correspond to servers that perform manipulations on a plurality of records containing the data stored in a second database, and the identifiers indicate order of the manipulations, and store the data in a third database in order indicated by the identifiers.

11 Claims, 23 Drawing Sheets

FIG. 7A

TABLE NAME: EMPLOYEE LIST

| EMPLOYEE NUMBER | NAME | BIRTH DATE | DEPARTMENT | |
|---|---|---|---|---|
| 11 | □□○○ | 4/11/1980 | SALES DEPARTMENT | } 43a |
| 12 | ○○×× | 7/3/1983 | DEVELOPMENT DEPARTMENT | } 43a |
| 13 | ××△△ | 10/15/1973 | DEVELOPMENT DEPARTMENT | } 43a |
| 25 | △△○○ | 1/23/1979 | SALES DEPARTMENT | } 43a |
| 26 | ○○□□ | 5/17/1991 | GENERAL AFFAIRS DEPARTMENT | } 43a |
| 25 | ××○○ | 9/20/1992 | SALES DEPARTMENT | } 43a |

FIG. 7B

TABLE NAME: CLIENT LIST

| CLIENT NAME | ADDRESS | TELEPHONE NUMBER | |
|---|---|---|---|
| DD CO., LTD. | ○-○-○ △△-CHO, ○○ CITY, □□ PREFECTURE | 123-456-7777 | } 43a |
| ABC STORE | ×-○-× □□□-CHO, △△ CITY, □□ PREFECTURE | 123-456-8888 | } 43a |
| AA CO., LTD. | △-△-△ ○○-CHO, □□ CITY, △△ PREFECTURE | 456-789-1111 | } 43a |
| PP UNIVERSITY | ×-×-× △△-CHO, □□ CITY, △△ PREFECTURE | 456-789-2222 | } 43a |

FIG. 7C

TABLE NAME: BRANCH LIST

| BRANCH NAME | BRANCH NUMBER | ADDRESS | TELEPHONE NUMBER | |
|---|---|---|---|---|
| AA BRANCH OFFICE | 101 | ○-○-○ △△-CHO, ○○ CITY, □□ PREFECTURE | 123-456-5555 | } 43a |
| BB BRANCH OFFICE | 011 | ×-○-× □□□-CHO, △△ CITY, □□ PREFECTURE | 123-456-3333 | } 43a |
| CC BRANCH OFFICE | 222 | △-△-△ ○○-CHO, □□ CITY, △△ PREFECTURE | 456-789-8888 | } 43a |
| DD BRANCH OFFICE | 320 | ×-×-× △△-CHO, □□ CITY, △△ PREFECTURE | 456-789-9999 | } 43a |

FIG. 9

| SEQUENCE NUMBER | DATA TYPE | TABLE NAME | PRIMARY KEY | CONTENT OF MANIPULATION | PRE-MANIPULATION DATA | POST-MANIPULATION DATA |
|---|---|---|---|---|---|---|
| 3 | DB | EMPLOYEE LIST | 12 | INSERT | | □□ |
| 4 | DB | CLIENT LIST | ABC STORE | UPDATE | ○○○○○ | ××××× |
| 5 | DB | CLIENT LIST | DD CO., LTD. | UPDATE | ××× | ○○○ |
| 6 | DB | BRANCH LIST | 011 | DELETE | △△△△ | |
| 7 | DB | EMPLOYEE LIST | 12 | UPDATE | □□ | △△ |
| 8 | CKPT | CHECKPOINT | CKPT | INSERT | CKPT | CKPT |

FIG. 16

<PRIMARY KEY LIST>

| TABLE NAME | PRIMARY KEY | PRE-UPDATE DATA |
|---|---|---|
| EMPLOYEE LIST | 1234 | ○○○○○ |
| BRANCH LIST | 011 | △△△△△ |
| CLIENT LIST | ABC STORE | ××××× |

80

INFORMATION PROCESSING DEVICE AND INFORMATION PROCESSING SYSTEM

CROSS-REFERENCE TO RELATED APPLICATION

This application is based upon and claims the benefit of priority of the prior Japanese Patent Application No. 2020-074859, filed on Apr. 20, 2020, the entire contents of which are incorporated herein by reference.

FIELD

A certain aspect of embodiments described herein relates to an information processing device, an information processing system, and a non-transitory computer-readable recording medium storing an information processing program.

BACKGROUND

To distribute the load when a database is referenced, a database to which the contents of the database are replicated may be created. In this case, the replication source database is called a master database (DB), and the replication destination database is called a replica DB.

When there are multiple client terminals referencing the database, the load distribution of the master DB can be achieved by having the client terminals reference not only the master DB but also the replica DB.

However, in the system using the replica DB, there is room for improvement in reduction in the response time when replicating the master DB to the replica DB. Note that the technique related to the present disclosure is also disclosed in Japanese Laid-Open Patent Publication Nos. H11-167510 and H10-49416.

SUMMARY

According to an aspect of the embodiments, there is provided an information processing device including: a memory; and a processor coupled to the memory and configured to: acquire a plurality of data from first databases, where the data are stored in the flat databases in a first period, and identifiers are stored in the first databases in association with the data, where the first databases correspond to servers that perform manipulations on a plurality of records containing the data stored in a second database, and the identifiers indicate order of the manipulations and store the data in a third database in order indicated by the identifiers.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 schematically illustrates the contents of a master DB in the embodiment.

FIG. 9 schematically illustrates the contents of a first difference DB in accordance with the embodiment.

FIG. 16 schematically illustrates a primary key list in accordance with the embodiment.

DESCRIPTION OF EMBODIMENTS

Prior to the description of an embodiment, what the inventor studied will be described.

Figure 1:
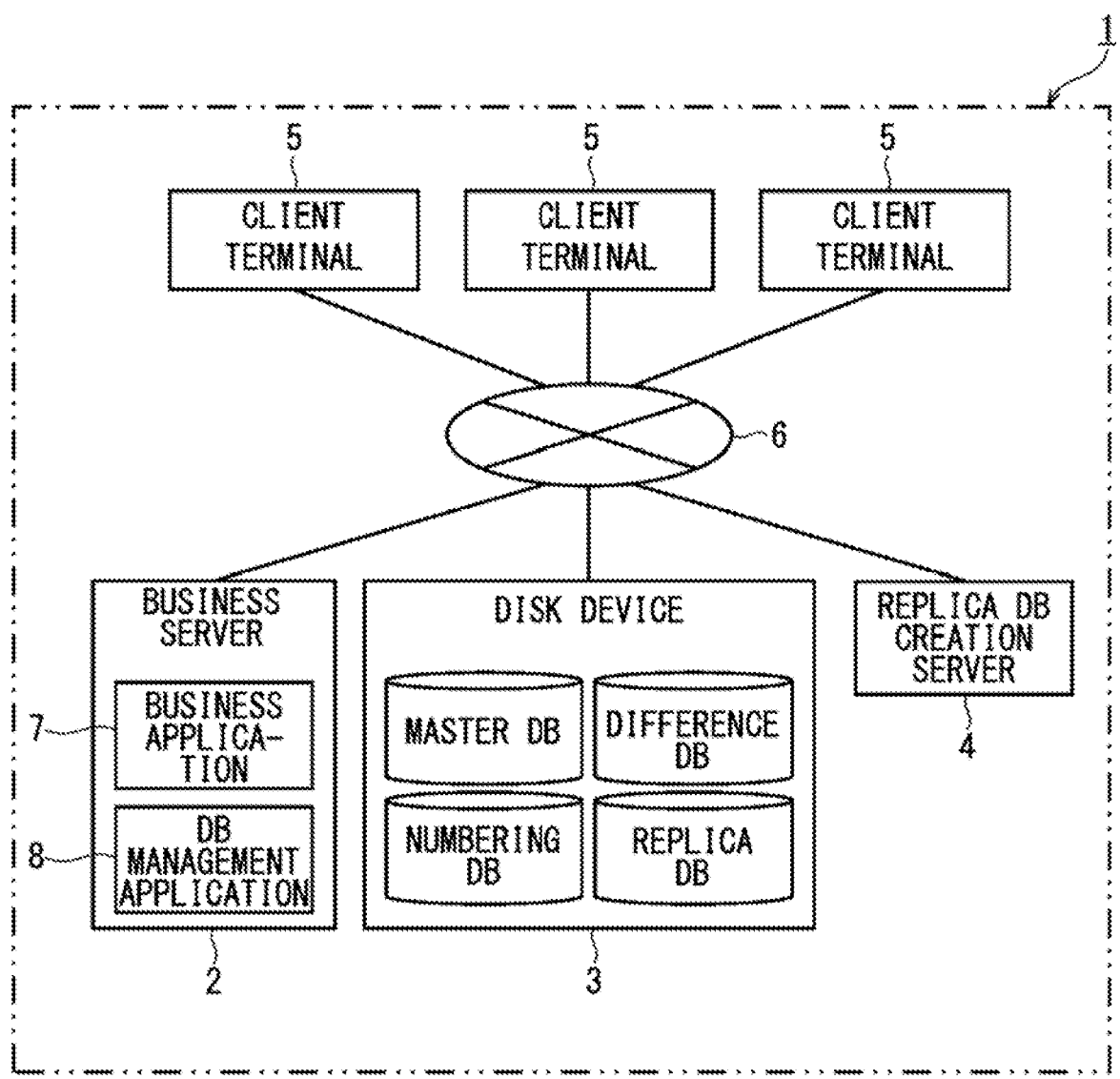
FIG. 1 is a configuration diagram of a system used in a study.

FIG. 1 is a configuration diagram of a system used in the study. The system 1 is a system that replicates a master DB to a replica DB, and includes a business server 2, a disk device 3, a replica DB creation server 4, and client terminals 5. These devices are interconnected via a network 6 such as the Internet.

The business server 2 is a server that performs manipulations such as update and insertion on a database of the disk device 3 in response to the request from the client terminal 5. Here, the business server 2 executes a business application 7, which is an application program for business, and a DB management application 8 for managing the database of the disk device 3.

The disk device 3 is a storage device storing a master DB, a numbering DB, a difference DB, and a replica DB.

The master DB is a database to be referenced by each client terminal 5. The numbering DB is a database that stores, when a manipulation such as deletion, insertion, or update is performed on a record of the master DB, the number indicating the order of the manipulation of the record.

The difference DB is a database that stores, when a manipulation is performed on a record of the master DB, the data of the record after the manipulation. The replica DB is a database that stores the replicated records of the master DB.

The replica DB creation server 4 is a server that creates the replica DB. The client terminal 5 is a computing device such as a personal computer (PC) operated by the user of the system 1.

Next, a processing flow in this system 1 will be described.

Figure 2:
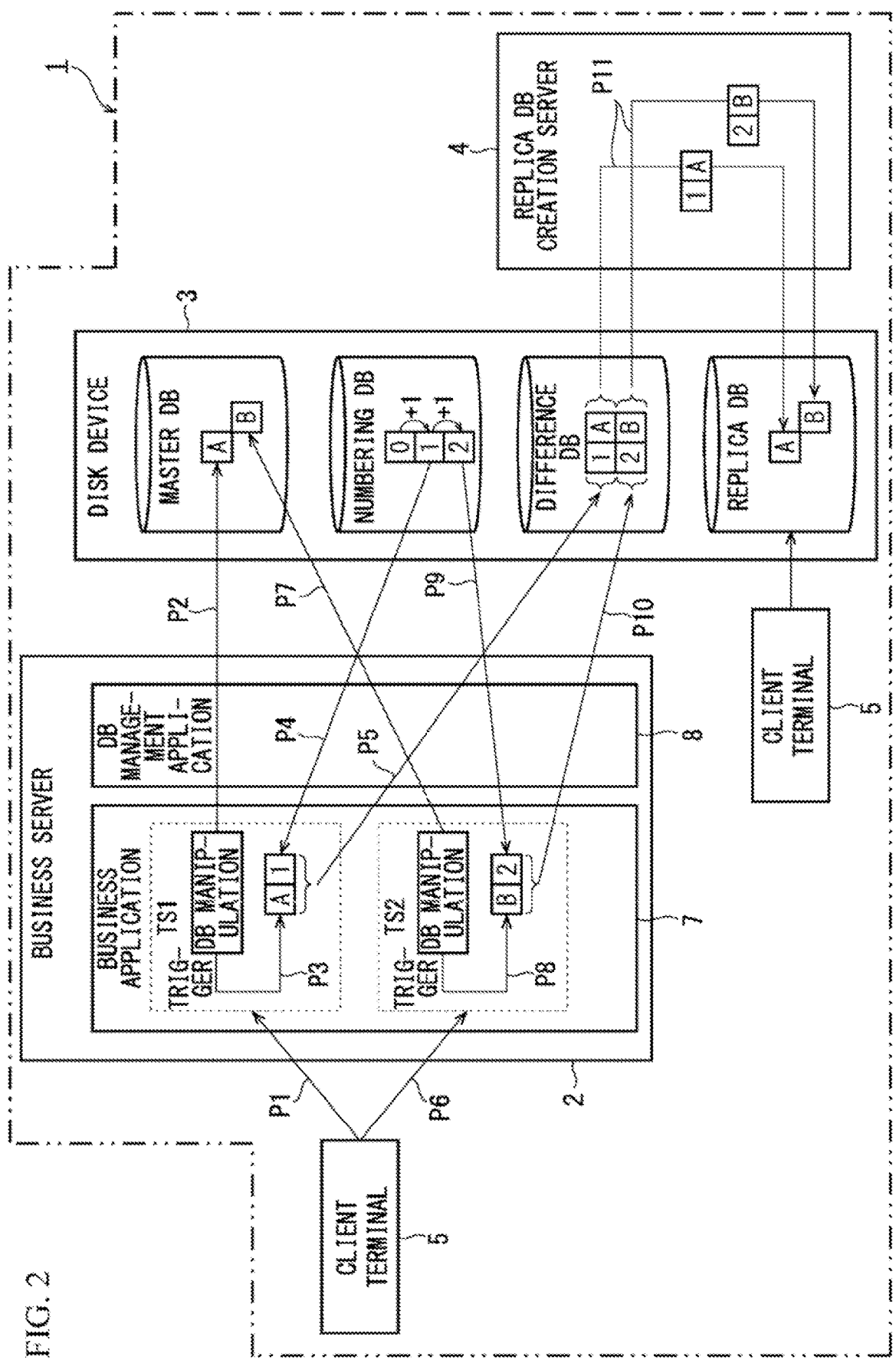
FIG. 2 schematically illustrates a processing flow in the system used in the study.

FIG. 2 schematically illustrates a processing flow in the system 1.

First, the client terminal 5 requests a manipulation of the master DB from the business server 2 (P1). The manipulation is deletion, insertion, or update of a record.

Then, the business application 7 of the business server 2 requests the manipulation of the master DB from the DB management application 8 in a transaction TS1, and the DB management application 8 manipulates the data of a record of the master DB (P2). Here, assume that the data of the record after the manipulation is "A". Hereinafter, the data after the manipulation is also simply called post-manipulation data.

Then, the business application 7 detects that the post-manipulation data of the record of the master DB is "A" using a trigger implemented in the DB management application 8 (P3).

Then, the business application 7 requests the DB management application 8 to increment the latest sequence number of the numbering DB by one, and acquire the incremented sequence number through the DB management application 8 (P4). Here, the latest sequence number in the numbering DB is "0", and the business application 7 acquires the sequence number "1", which is obtained by incrementing "0" by one.

Then, the business application 7 stores the post-manipulation data "A" and the sequence number "1" in the difference DB in association with each other through the DB management application 8 (P5).

The client terminal 5 then requests a manipulation of the master DB from the business server 2 again (P6).

Then, the business application 7 requests the manipulation of the master DB from the DB management application 8 in a transaction TS2, and the DB management application 8 manipulates the data of a record of the master DB (P7). Assume that the post-manipulation data of the record is "B" in this example.

Then, the business application 7 detects that the post-manipulation data of the record of the master DB is "B" using a trigger implemented in the DB management application 8 (P8).

Then, the business application 7 requests the DB management application 8 to increment the latest sequence number of the numbering DB by one, and acquires the incremented sequence number through the DB management application 8 (P9). In this example, since the latest sequence number of the numbering DB is "1", the business application 7 acquires the sequence number "2", which is obtained by incrementing "1" by one.

Then, the business application 7 stores the post-manipulation data "B" and the sequence number "2" in the difference DB in association with each other through the DB management application 8 (P10).

Then, the replica DB creation server 4 reads the post-manipulation data stored in the difference DB in ascending order of the sequence number, and stores the read post-manipulation data in the replica DB (P11). In this example, the replica DB creation server 4 stores the post-manipulation data "A" associated with the sequence number "1" in the replica DB first, and then stores the post-manipulation data "B" associated with the sequence number "2" in the replica DB. Thereafter, the replica DB creation server 4 deletes, from the difference DB, the post-manipulation data stored in the replica DB. This completes the basic processing of the system 1.

In the system 1, the business server 2 stores the post-manipulation data of the record of the master DB and the sequence number in the difference DB in association with each other (P5, P10), and the replica DB creation server 4 stores the post-manipulation data in the replica DB in ascending order of the sequence number (P11). This causes the contents of the replica DB to be identical to the contents of the master DB, and thereby, the replica DB to which the master DB is replicated can be acquired. Therefore, the client terminal 5 can reference the replica DB instead of the master DB, and concentration of accesses to the master DB is inhibited.

FIG. 2 describes a case where one business server 2 accesses the disk device 3, as an example. However, in some systems, a plurality of the business servers 2 may access the disk device 3. For example, a plurality of the business servers 2 and the disk device 3 may be distributed in different regions or countries so that the business server 2 in other regions can have continued access to the system 1 even when failures occur in: the business server 2 in one region.

Figure 3:
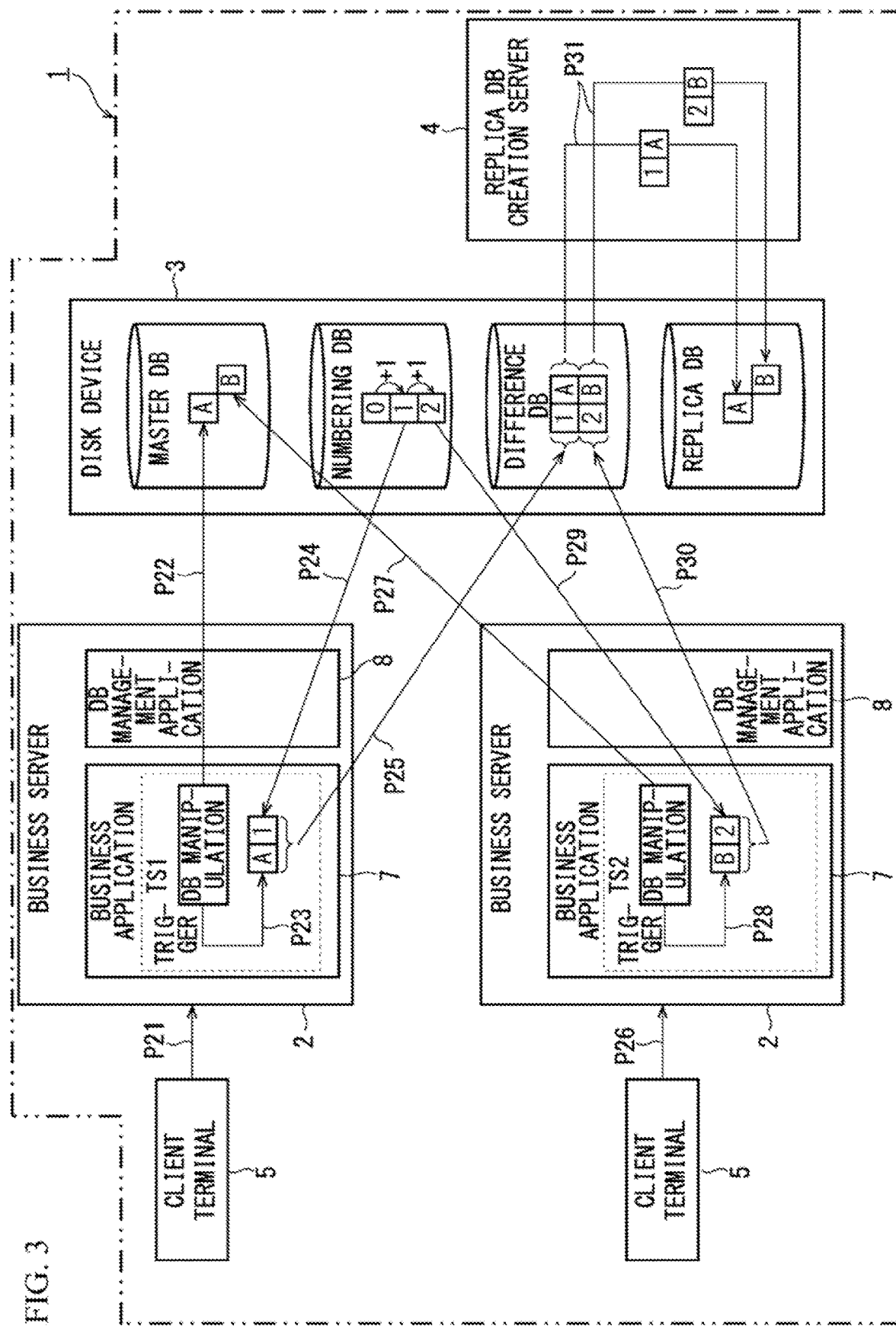
FIG. 3 schematically illustrates a processing flow in the system used for study.

FIG. 3 schematically illustrates a processing flow in the system 1 in this case.

In this case, first, the client terminal 5 requests a manipulation of the master DB from one of the business servers 2 (P21).

Then, the business application 7 of the business server 2 requests the manipulation of the master DB from the management application 8 in the transaction TS1, and the DB management application 8 manipulates a record of the master DB (P22). Here, assume that the post-manipulation data of the record is "A".

Then, the business application 7 detects that the post-manipulation data of the record of the master DB is "A" using a trigger implemented in the DB management application 8 (P23).

Then, the business application 7 requests the DB management application 8 to increment the latest sequence number of the numbering DB by one, and acquires the incremented sequence number through the DB management application 8 (P24). As in the example of FIG. 2, the latest sequence number of the numbering DB is "0", and the business application 7 acquires the sequence number "1", which is obtained by incrementing "0" by one.

Then, the business application 7 stores the post-manipulation data "A" and the sequence number "1" in the difference DB in association with each other through the DB management application 8 (P25).

Then, the client terminal 5 requests a manipulation of the master DB from another business server 2 (P16).

Then, the business application 7 of the business server 2 that has received the request requests the manipulation of the master DB from the DB management application 8 of its own business server 2 in the transaction TS2, and the DB management application 8 manipulates a record of the master DB (P27). As in the example of FIG. 2, assume that the post-manipulation data of the record is "B" also in this example.

Then, the business application 7 detects that the post-manipulation data of the record of the master DB is "B" using a trigger implemented in the DB management application 8 (P28).

Then, the business application 7 requests the DB management application 8 to increment the latest sequence number of the numbering DB by one, and acquires the incremented sequence number through the DB management application 8 (P29). Here, since the latest sequence number of the numbering DB is "1", the business application 7 acquires the sequence number "2", which is obtained by incrementing "1" by one.

Then, the business application 7 stores the post-manipulation data "B" and the sequence number "2" in the difference DB in association with each other through the DB management application 8 (P30).

Then, the replica DB creation server 4 reads the post-manipulation data stored in the difference DB in ascending order of the sequence number, and stores them in the replica DB (P31).

This completes the basic processing of the system 1 in the case where the business server 2 is provided in plural. Even in this case, each business server 2 stores the post-manipulation data of the record and the sequence number of the numbering DB in the difference DB in association with each other, so that the replica DB creation server 4 can create the replica DB having the contents identical to the contents of the master DB.

However, in the case where multiple business servers 2 access the numbering DB and the difference DB as described above, the DB management application 8 needs to perform exclusive control of the access to ensure the consistency of the numbering DB and the consistency of the difference DB.

Figure 4:
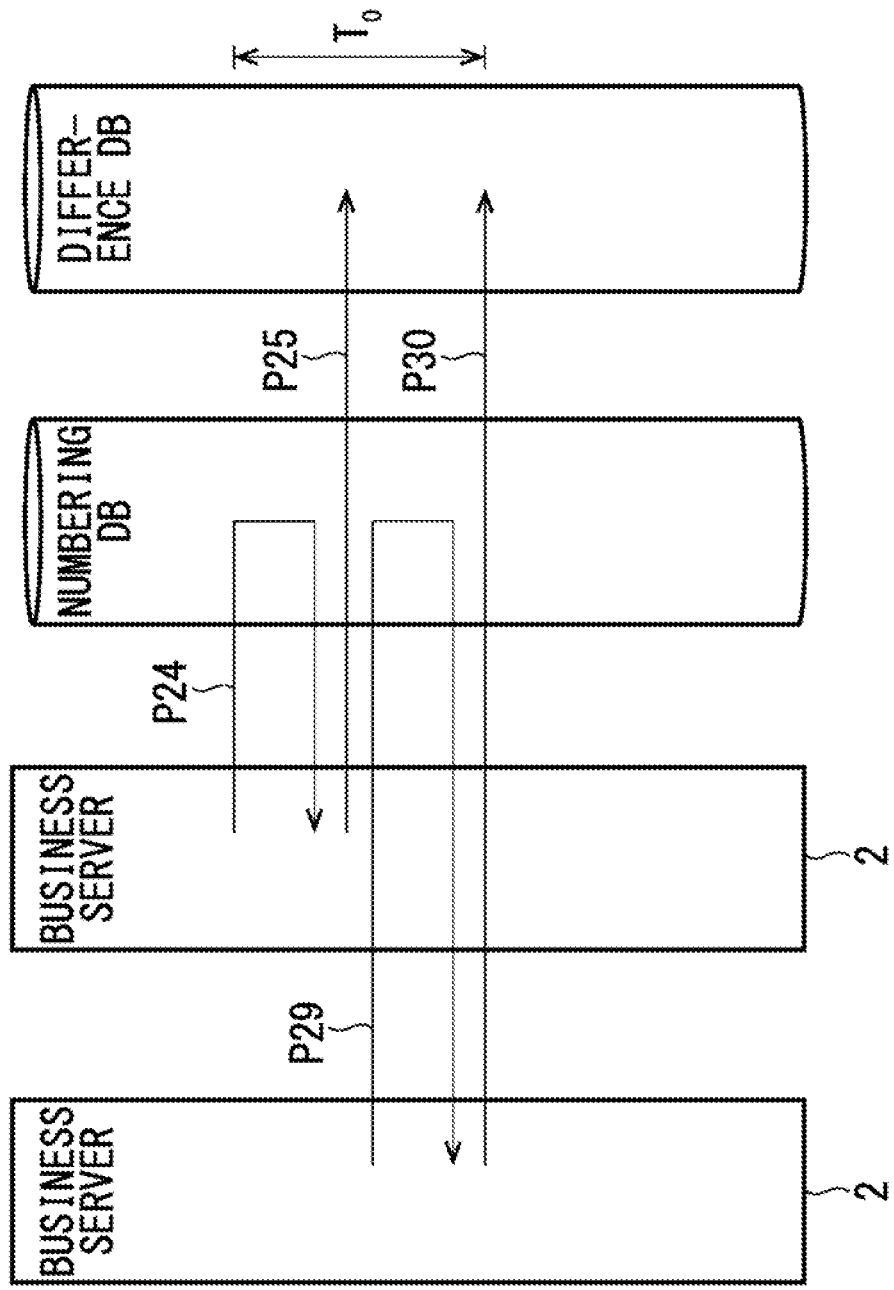
FIG. 4 schematically illustrates exclusive control.

FIG. 4 schematically illustrates the exclusive control. As illustrated in FIG. 4, in this example, to ensure the consistency of the numbering DB, it is necessary that after one business server 2 executes step P24, another business server 2 executes step P29.

Similarly, to ensure the consistency of the difference DB, it is necessary that after one business server 2 executes step P25, another business server 2 executes step P30.

When accesses to the numbering DB and the difference DB are performed exclusively as described above, the response time. To from the execution of step P24 to the completion of step P30 increases. In particular, as the number of the business servers 2 increases, the response time $T_0$ significantly increases.

Embodiment

Figure 5:
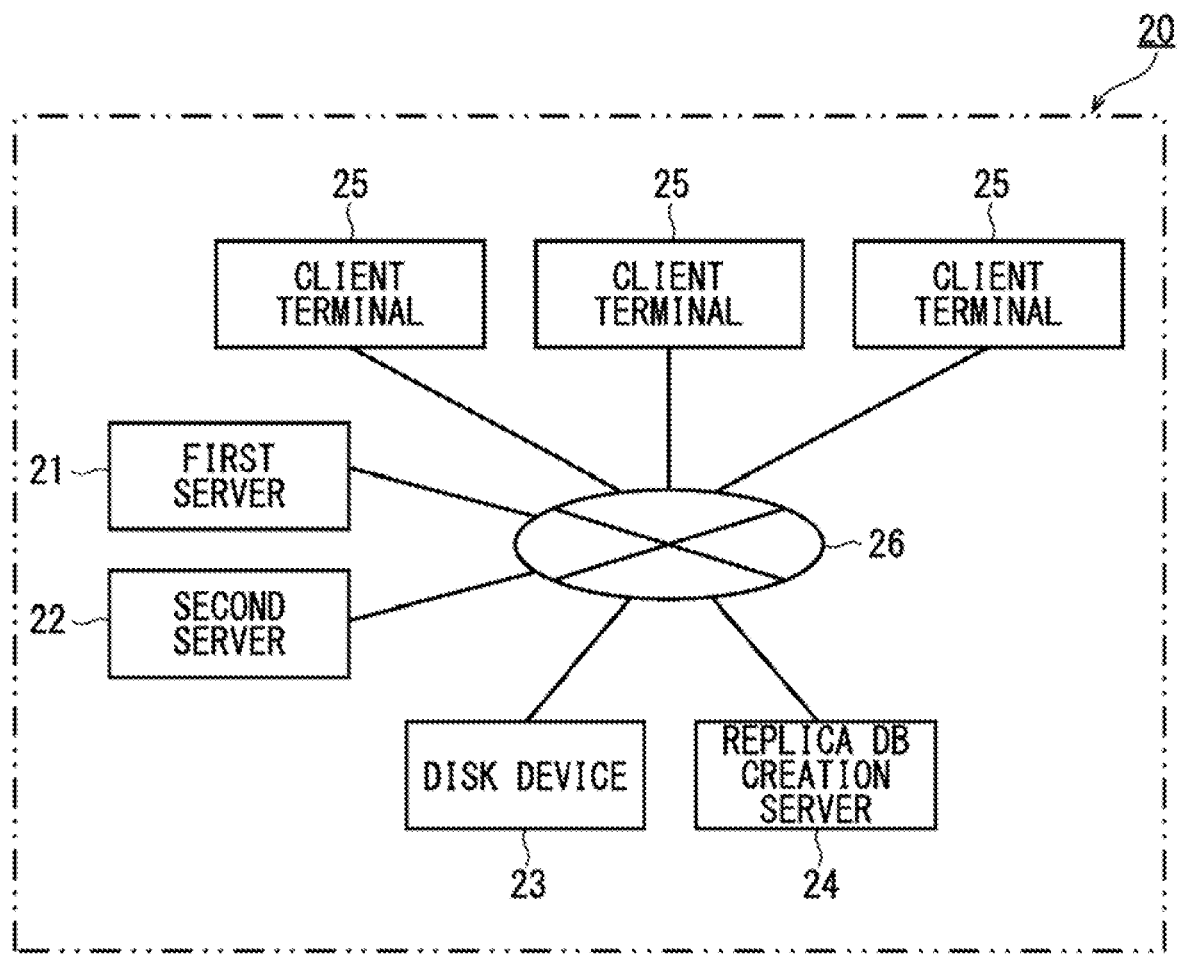
FIG. 5 is a system configuration diagram of an information processing system in accordance with an embodiment.

FIG. 5 is a system configuration diagram of an information processing system in accordance with an embodiment.

An information processing system 20 is a system that replicates the master DB to the replica DB, and includes a first server 21, a second server 22, a disk device 23, a replica DB creation server 24, and client terminals 25. These devices are interconnected via a network 26 such as the Internet.

The first server 21 and the second server 22 are servers that perform any of manipulations including insertion, deletion, and update of a record in a database of the disk device 23 in response to a request from the client terminal 25.

The disk device 23 is a storage device, such as a hard disk drive (HDD) or a solid state drive (SSD), that stores various types of databases such as the master DB and the replica DB. The replica DB creation server 24 is an example of an information processing device, and is a server that creates the replica DB in the disk device 23. The client terminal 25 is a computing device such as a PC operated by the user of the information processing system 20.

Next, a description will be given of the databases stored in the disk device 23.

Figure 6:
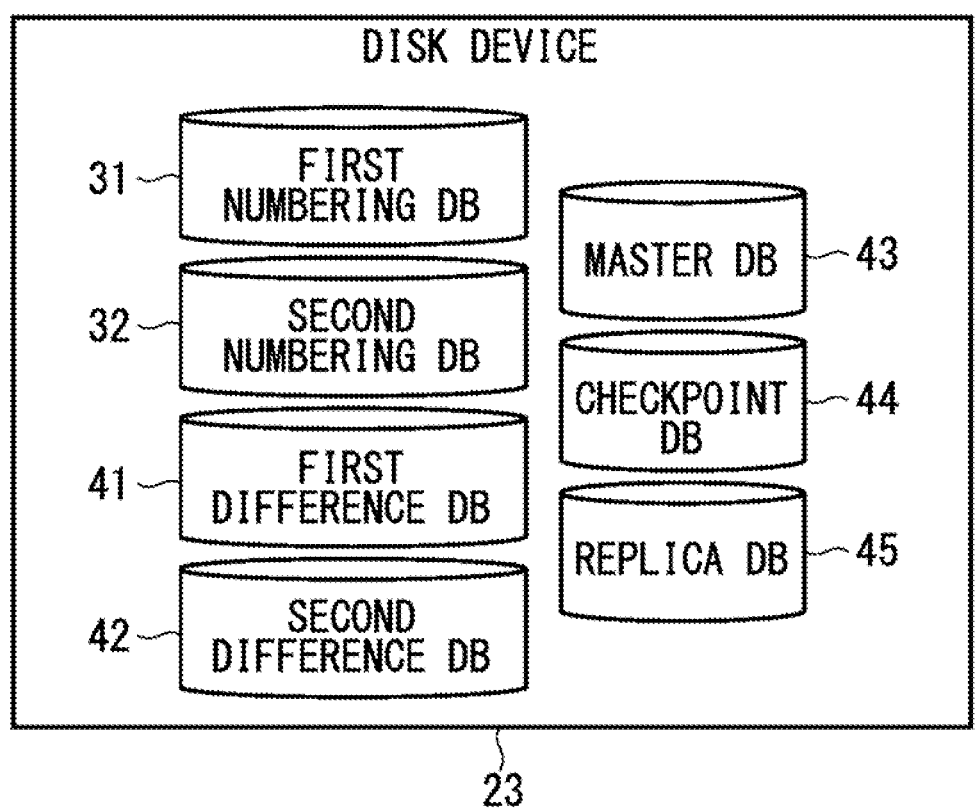
FIG. 6 schematically illustrates a disk device in accordance with the embodiment.

FIG. 6 schematically illustrates the disk device 23. As illustrated in FIG. 6, the disk device 23 stores a first numbering DB 31, a second numbering DB 32, a first difference DB 41, a second difference DB 42, a master DB 43, a checkpoint DB 44, and a replica DB 45.

The master DB 43 is a replication source database, and the replica DB 45 is a replication destination database.

The first numbering DB 31 and the first difference DB 41 are databases corresponding to the first server 21, and only the first server 21 of the servers 21 and 22 is allowed to access the first numbering DB 31 and the first difference DB 41.

The second numbering DB 32 and the second difference DB 42 are databases corresponding to the second server 22, and only the second server 22 of the servers 21 and 22 is allowed to access the second numbering DB 32 and the second difference DB 42.

The first numbering DB 31 and the second numbering DB 32 are both examples of fifth databases.

The checkpoint DB 44 is an example of a fourth database, and is a database used when acquiring the contents of the difference DBs 41 and 42 in a predetermined check period.

Next, a description will be given of the contents of the master DB 43, the first and second numbering DBs 31 and 32, the first and second difference DBs 41 and 42, and the checkpoint DB 44.

FIG. 7 schematically illustrates the contents of the master DB 43. In the example of FIG. 7, three databases of which the table names are respectively "EMPLOYEE LIST", "CLIENT LIST", and "BRANCH LIST" are stored in the master DB. Each of these databases store a plurality of records 43a each being a row of data. The number of databases stored in the master DB 43 is not limited to this example. For example, only one database may be stored in the master DB 43, or four or more databases may be stored in the master DB 43.

The primary key for uniquely identifying one of the records 43a differs depending on the database. For example, the primary key for the table name "EMPLOYEE LIST" is the attribute "employee number". The primary key for the table name "CLIENT LIST" is the attribute "client name". The primary key for the table name "BRANCH LIST" is the attribute "branch number".

Figure 8A:
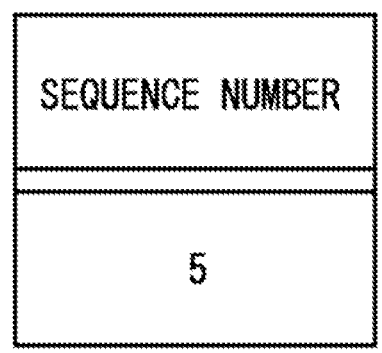
FIG. 8A schematically illustrates the contents of a first numbering DB in accordance with the embodiment, and FIG. 8B schematically illustrates the contents of a checkpoint DB in accordance with the embodiment.

FIG. 8A schematically illustrates the contents of the first numbering DB 31.

As illustrated in FIG. 8A, the first numbering DB 31 is a database containing only the sequence number as the attribute. The sequence number is an example of an identifier for identifying the order of manipulations performed by the first server 21 on the master DB 43. Here, an integer is employed as the sequence number.

Similarly, the second numbering DB 32 is also a database containing only the sequence number as the attribute. For example, the second numbering DB 32 stores the sequence number, which has an integer value, as an identifier for identifying the order of manipulations performed by the second server 22 on the master DB 43.

Figure 8B:
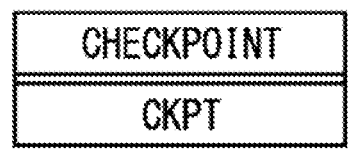

FIG. 8B schematically illustrates the contents of the checkpoint DB 44.

As illustrated an FIG. 8B, the checkpoint DB 44 is a database of which the table name is "CHECKPOINT". The checkpoint DB 44 stores only the string "CKPT" as the attribute "checkpoint" that is updated every predetermined check period CT. The length of the check period CT is not particularly limited, but here, assume that the length of the check period CT is approximately one minute. The check period CT is an example of a first period.

FIG. 9 schematically illustrates the contents of the first difference DB 41.

As illustrated in FIG. 9, the first difference DB 41 stores a plurality of difference records 49 in which attributes "sequence number", "data type", "table name", "primary key", "content of manipulation", "pre-manipulation data", and "post-manipulation data" are associated with each other.

The "sequence number" is the "sequence number" in the first numbering DB 31. The "data type" is a string for identifying which post-manipulation data of the master DB 43 or the checkpoint DB 44 is stored in the first difference DB 41. For example, when the post-manipulation data of the master DB 43 is stored in the first difference DB 41, the string "DB" is stored in the "data type". When the post-manipulation data of the checkpoint DB 44 is stored in the first difference DB 41, the string "CKPT" is stored in the "data type".

The "table name" is the table name of the database stored in either the master DB 43 or the checkpoint DB 44.

The "primary key" is the attribute that can uniquely identify the record 43a among the attributes of the master DB 43. The string "CKPT" is stored in the "primary key" of the differential record 49 corresponding to the checkpoint DB 44.

The "content of manipulation" is the content of the manipulation performed by the first server 21 on the master DB 43. For example. "UPDATE", "DELETE", or "INSERT" is stored in the "content of manipulation". Since the manipulation of the checkpoint DB 44 performed by the first server 21 is always insertion, "INSERT" is stored in the "content of manipulation" corresponding to the checkpoint DB 44.

The "pre-manipulation data" is the data stored in the master DB 43 before the first server 21 manipulates the master DB 43 or the data stored in the checkpoint DB 44 before the first server 21 manipulates the checkpoint DB 44. By contrast, the "post-manipulation data" is the data stored in the master DB 43 after the first server 21 manipulates the master DB 43 or the data stored in the checkpoint DB 44 after the first server 21 manipulates the checkpoint DB 44.

Since the content of the checkpoint DB 44 is always the string "CKPT", the "pre-manipulation data" and the "post-manipulation data" are both "CKPT".

The second difference DB 42 also stores the differential records 49 in which the same attributes as those in the first difference DB 41 are associated with each other. Among the attributes of the second difference DB 42, the "sequence number" stores the "sequence number" oft the second numbering DB 32. The "pre-manipulation data" stores the data stored in the master DB 43 before the second server 22 manipulates the master DB 43 or the data stored in the checkpoint DB 44 before the second server 22 manipulates the checkpoint DB 44. The "post-manipulation data" stores the data stored in the master DB 43 after the second server 22 manipulates the master DB 43 or the data stored in the checkpoint DB 44 after the second server 22 manipulates the checkpoint DB 44.

Next, a description will be given of a processing flow when the contents of the master DB 43 are replicated to the replica DB 45 in the information processing system 20.

Figure 10:
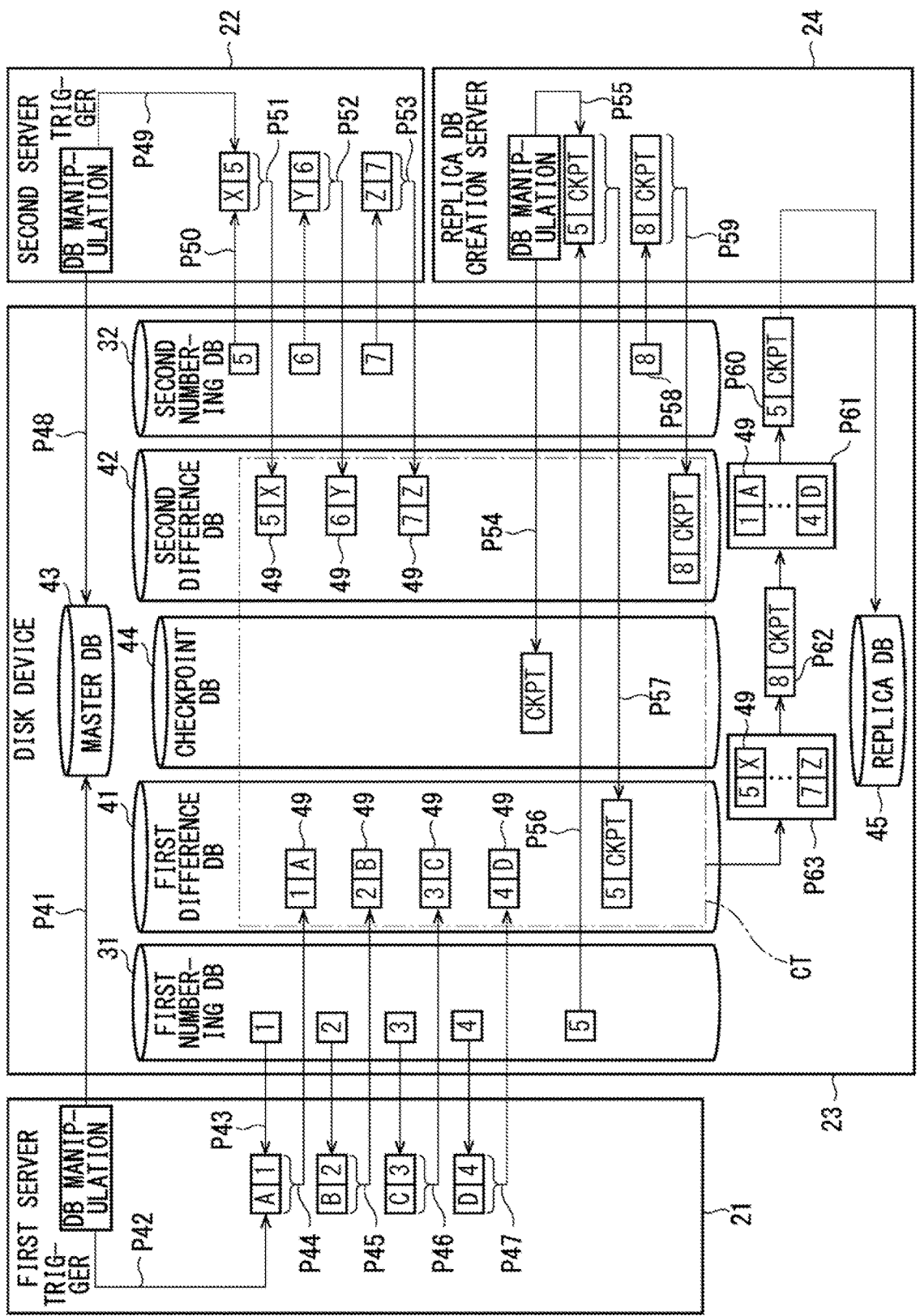
FIG. 10 schematically illustrates a processing flow in the information processing system in accordance with the embodiment.

FIG. 10 schematically illustrates a processing flow in the information processing system 20.

In the present embodiment, when the first server 21 and the second server 22 access the disk device 23, the contents of the master DB 43 are replicated to the replica DB 45 as described below without the exclusive control of the access.

First, the first server 21 receives, from the client terminal 25 (see FIG. 5), a notification requesting a manipulation of the master DB 43, and manipulates the record 43a of the master DB 43 with the reception of the notification as a trigger (P41).

Then, the first server 21 acquires the post-manipulation data of the record 43a after the manipulation of the master DB, using a trigger (P42). Here, assume that the post-manipulation data is "A".

Then, the first server 21 increments the latest sequence number of the first numbering DB 31 by one, and acquires the incremented sequence number (P43). In this example, the latest sequence number in the first numbering DB 31 is "0", and the first server 21 acquires the sequence number "1", which is obtained by incrementing "0" by one.

Then, the first server 21 stores the differential record 49 in which the post-manipulation data "A" is associated with the sequence number "1" in the first difference DB 41 (P44). In FIG. 10, the attributes of the differential record 49 other than the "post-manipulation data" and the "sequence number" in FIG. 9 are omitted.

Thereafter, in the same manner as described above, the first server 21 manipulates the master DB 43, and stores the differential record 49 in which the post-manipulation data is associated with the sequence number in the first difference DB 41 (P45 to P47). As an example, the first server 21 stores the differential records 49 in which the post-manipulation data "B", "C", and "D" are associated with the sequence numbers "2" "3", and "4" respectively, in the first difference DB 41.

Then, the second server 22 accesses the master DB 43, the second numbering DB 32, and the second difference DB 42 asynchronously with respect to steps P41 to P47 (P48 to P53).

For example, the second server 22 receives, from the client terminal 25 (see FIG. 5), a notification requesting a manipulation of the master DB 43, and manipulates the record 43a of the master DB 43 with the reception of the notification as a trigger (P48).

Then, the second server 22 acquires the post-manipulation data of the master DB using a trigger (P49). In this example, assume that the post-manipulation data is "X".

Then, the second server 22 increments the latest sequence number of the second numbering DB 32 by one, and acquires the incremented sequence number (P50). In this example, the latest sequence number of the second numbering DB 32 is "4", and the second server 22 acquires the sequence number "5", which is obtained by incrementing "4" by one.

The sequence number in the second numbering DB 32 is an integer for identifying the order of manipulations performed by the second server 22 on the master DB 43, and is independent from the sequence number in the first numbering DB 31. Thus, the precedence of the sequence number "5" of the second numbering DB 32 and the sequence number "1" of the first numbering DB 31 is arbitrary. For example, the, sequence number "5" may precede the sequence number "1", or the sequence number "5" may precede the sequence number "1". The same applies to other sequence numbers.

Then, the second server 22 stores the differential record 49 in which the post-manipulation data "X" is associated with the sequence number "5" in the second difference DB 42 (P51).

Thereafter, in the same manner as described above, the second server 22 manipulates the master DB 43, and stores the differential records 49 in the second difference DB 42 (P52 to P53). For example, the second server 22 stores the differential records 49 in which the post-manipulation data "Y" and "Z" are associated with the sequence numbers "6" and "7", respectively, in the second difference DB 42.

Then, the replica DB creation server 24 inserts the string "CKPT" into the checkpoint DB 44 by manipulating the checkpoint DB 44 (P54). The replica DB creation server 24 manipulates the checkpoint DB 44 only once during the predetermined check period CT. Therefore, the replica DB creation server 24 regularly inserts the string "CKPT" into the checkpoint DB 44 ever check period CT.

Note that since the string "CKPT" has been stored in the checkpoint DB 44 before this manipulation as illustrated in FIG. 8B, the content of the checkpoint DB 44 does not change before and after this manipulation.

Then, the replica DB creation server 24 acquires the string "CKPT" inserted into the checkpoint DB 44 by using a trigger (P55).

Then, the replica DB creation server 24 references the first numbering DB 31 to identify the sequence number obtained by incrementing the latest sequence number in the first numbering DB 31 by one (P56). In this example, since the latest sequence number in the first numbering DB 31 is "4", the replica DB creation server 24 identifies the sequence number "5", which is obtained by incrementing "4" by one. The sequence number "5" is an example of an end identifier indicating the end of the check period CT in the first difference DB 41.

Then, the replica DB creation server 24 stores the sequence number "5" and the string "CKPT" in the first difference DB 41 in association with each other (P57).

Then, the replica DB creation server 24 references the second numbering DB 32 to identify the sequence number obtained by incrementing the latest sequence number in the second numbering DB 32 by one (P58). Here, since the latest sequence number of the second numbering DB 32 is "7", the replica DB creation server 24 identifies the sequence number "8", which is obtained by incrementing "7" by one. The sequence number "8" is an example of an end identifier indicating the end of the check period CT in the second difference DB 42.

Then, the replica DB creation server 24 stores the sequence number "8" and the string "CKPT" in the second difference DB 42 in association with each other (P59).

Then, the replica DB creation server 24 references the first difference DB 41 to identify the sequence number "5" associated with the string "CKPT" (P60).

Then, the replica DB creation server 24 acquires, from the first difference DB 41, all the differential records 49 containing the sequence numbers preceding the sequence number "5", and stores the acquired post-manipulation data in the replica DB 45 in ascending order of the sequence number (P61).

In this example, the replica DB creation server 24 acquires the differential records 49 containing the post-manipulation data "A" to "D" respectively associated with the sequence numbers "1" to "4" preceding the sequence number "5". The replica DB creation server 24 then stores the acquired post-manipulation data in the replica DB 45 in the order of "A", "B", "C", and "D".

Thereafter, the replica DB creation server 24 deletes the differential records 49 containing the sequence numbers preceding the sequence number "5" from the first difference DB 41. In this example, the replica DB creation server 24 deletes the differential records 49 containing the post-manipulation data "A" to "D" from the first difference DB 41.

Similarly, the replica DB creation server 24 references the second difference DB 42 to identify the sequence number "8" associated with the string "CKPT" (P62).

Then, the replica DB creation server 24 acquires, from the second difference DB 42, all the differential records 49 containing the sequence numbers preceding the identified sequence number "8", and stores the acquired post-manipulation data in the replica DB 45 in ascending order of the sequence number (P63).

Here, the replica DB creation server 24 acquires the differential records 49 containing the post-manipulation data "X" to "Z" respectively associated with the sequence numbers "5" to "7" preceding the sequence number "8". Then, the replica DB creation server 24 stores the post-manipulation data in the replica DB 45 in the order of "X", "Y", and "Z".

Thereafter, the replica DB creation server 24 deletes the differential records 49 containing the sequence numbers preceding the sequence number "8" from the second difference DB 42. In this example, the replica DB creation server 24 deletes the differential records 49 containing the post-manipulation data "X" to "Z" from the second difference DB 42.

This completes the basic processing in the information processing system 20.

Accordingly, the first numbering DB 31 and the first difference DB 41 are provided for the first server 21, the second numbering DB 32 and the second difference DB 42 are provided for the second server 22, and the replica DB creation server 24 stores the post-manipulation data in the replica DB 45 in ascending order of the sequence number. Therefore, even when the accesses of the servers 21 and 22 to the respective numbering DBs 31 and 32 and the respective difference DBs 41 and 42 are not exclusively controlled, the consistency of the post-manipulation data in the replica DB can be ensured.

In P57, since the replica DB creation server 24 accesses the first difference DB 41, the access of the replica DB creation server 24 to the first difference DB 41 and the access of the first server 21 to the first difference DB 41 are exclusively performed at this timing. However, since P57 is performed only once per the check period CT, this does not largely degrade the response time of the information processing system 20.

Although the replica DB creation server 24 is provided separately from the servers 21 and 22 in this example, either the first server 21 or the second server 22 may have the functions of the replica DB creation server 24. In this case, for example, the first server 21 performs the processes in P54 to P63.

The sequence numbers "1" to "4" of the first numbering DB 31 indicate the order of the manipulations performed by the first server 21 on the master DB 43. Thus, the consistency of the records manipulated by the first server 21 is maintained by storing the post-manipulation data "A" to "D" in the replica DB 45 in ascending order of the sequence number.

However, it is impossible to identify the temporal relationship between the sequence number of the first numbering DB 31 and the sequence number of the second numbering DB 32. Thus, it is impossible to identify the order in which the first server 21 and the second server 22 manipulated the master DB 43 using the sequence numbers alone. For example, the sequence number "3" of the first numbering DB 31 is smaller than the sequence number "5" of the second numbering DB 32, but it is not always true that the manipulation corresponding to the sequence number "3" was performed before the manipulation corresponding to the sequence number "5".

Therefore, when the first server 21 and the second server 22 manipulated the same record 43a in the master DB 43, the consistency of the replica DB 45 is not maintained even when the post-manipulation data is stored in the replica DB 45 in ascending order of the sequence number.

In such a case, the post-manipulation data of the record 43a that was manipulated last is identified based on allowable state transitions between manipulations for the same record 43a as described below, and the identified post-manipulation data is stored in the replica DB 45.

Figure 11:
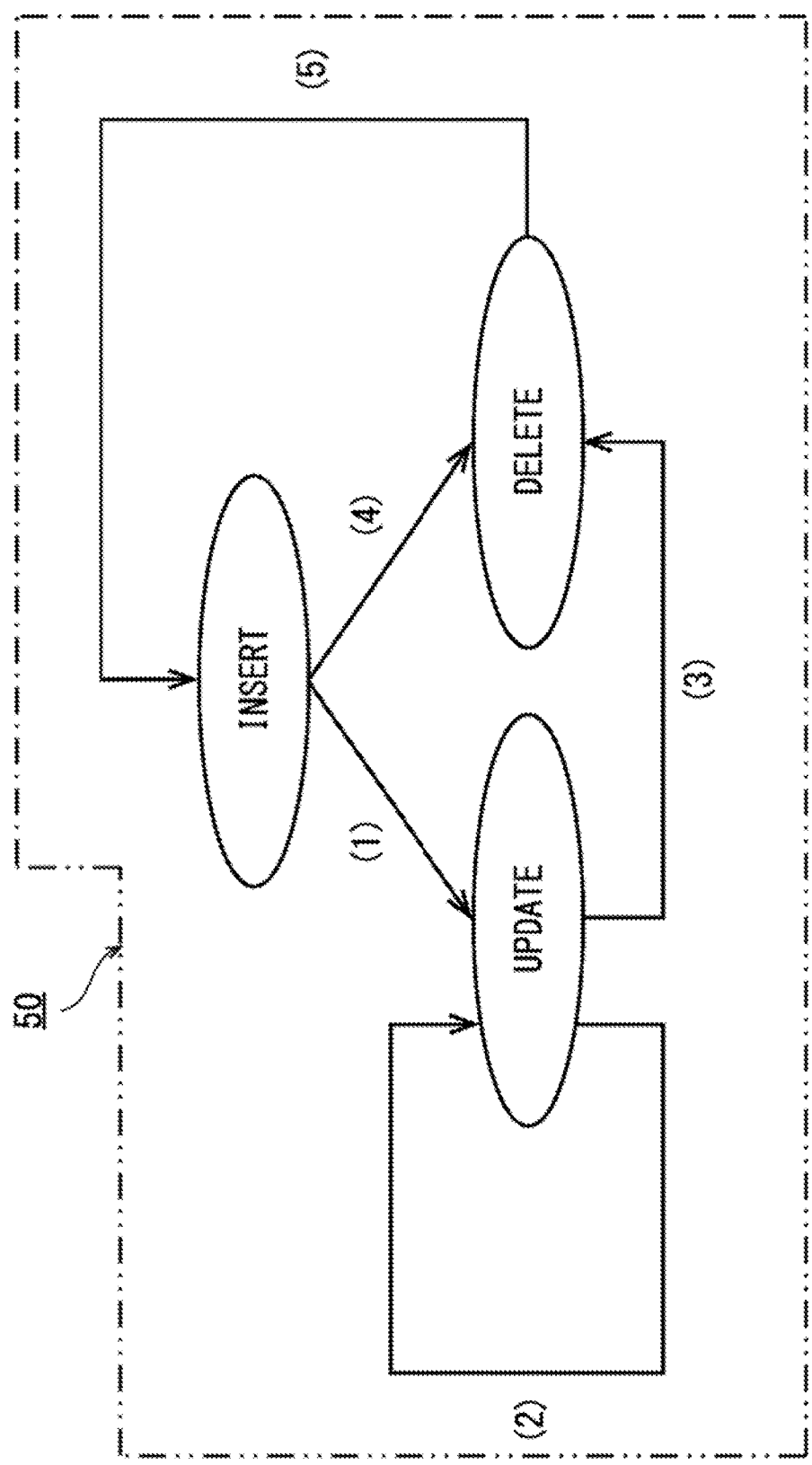
FIG. 11 schematically illustrates allowable state transitions between manipulations of the same record in the master DB in the embodiment.

FIG. 11 schematically illustrates allowable state transitions between manipulations for the same record 43a in the master DB 43.

This state transition 50 is a state transition between manipulations allowed to maintain the consistency of the master DB 43.

As illustrated in FIG. 11, only the transitions (1) to (5) are allowed between manipulations. The transition (1) is a transition in which a certain record 43a is "insert"ed, and the inserted record 43a is then "update"d. The transition (2) is a transition in which a certain record 43a is "update"d, and the updated record 43a is then "update"d again.

The transition (3) is a transition in which a certain record 43a is "update"d, and the updated record 43a is then "delete"d. The transition (4) is a transition in which a certain record 43a is "insert"ed, and the inserted record 43a is then "delete"d.

The transition (5) is a transition in which a certain record 43a is "delete"d, and the deleted record 43a is then "insert"ed again.

Figure 12:
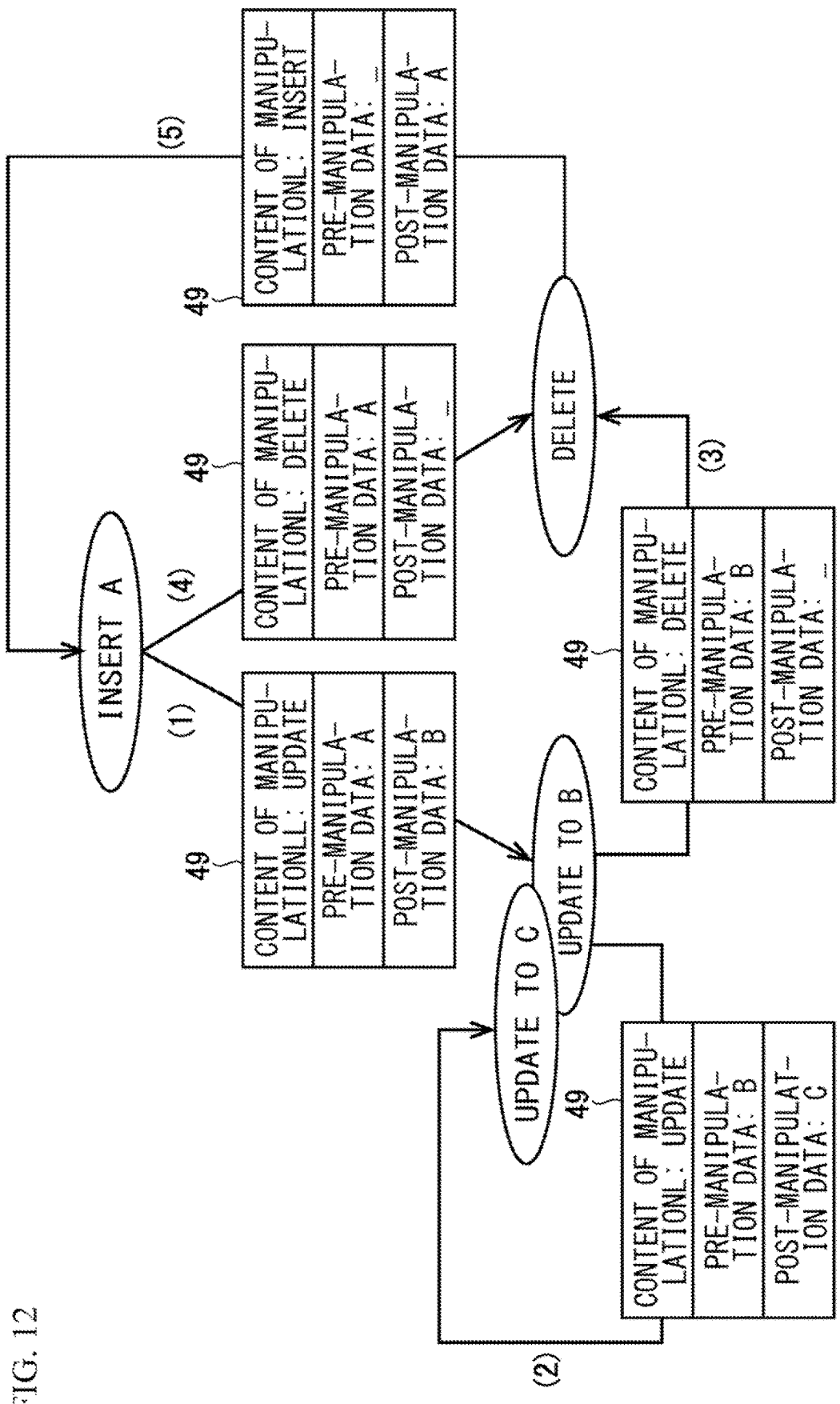
FIG. 12 schematically illustrates tangible examples of transitions between manipulations in the embodiment.

FIG. 12 schematically illustrates tangible examples of the transitions between manipulations. In FIG. 12, the differential record 49 after each manipulation is also presented.

In this example, in the transition (1), the data of the inserted record 43a is updated from "A" to "B". In the transition (2), the data of the record 43a is updated from "B" to "C".

In the transition (3), the record 43a of which the data has been updated to "B" is deleted. In the transition (4), the inserted record 43a having the data "A" is deleted.

In the transition (5), the data of the deleted record 43a is set at "A", and the record 43a is inserted again.

Use of the allowable state transitions between the manipulations allows the consistency of the replica DB 45 to be maintained as described below even when the servers 21 and 22 manipulate the same record 43a in the master DB 43.

Figure 13:
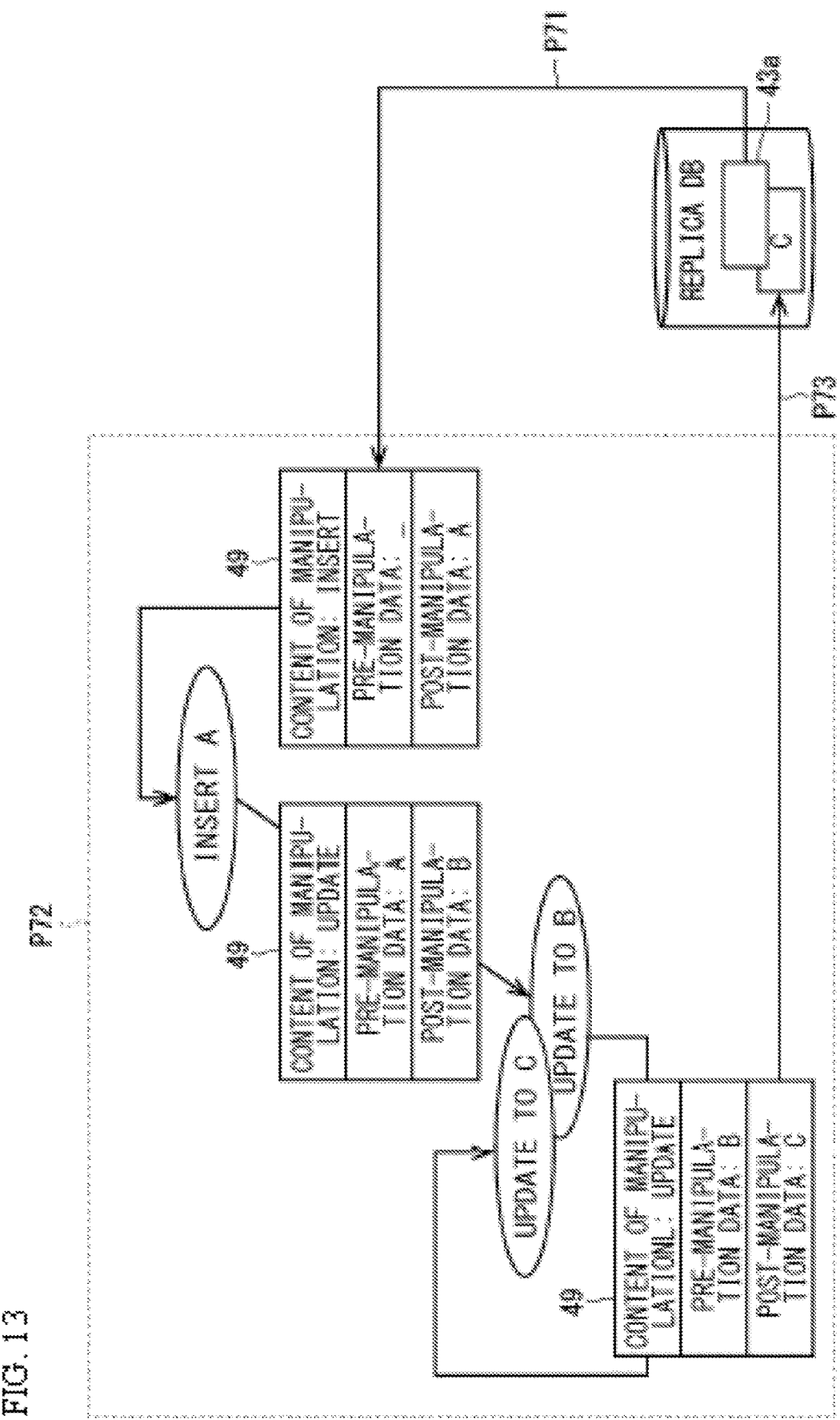
FIG. 13 schematically illustrates a method for maintaining the consistency of the replica DB using the state transitions between manipulations in the embodiment.

FIG. 13 schematically illustrates a method for maintaining the consistency of the replica DB 45 using the state transitions between the manipulations.

Here, a case where the first server 21 and the second server 22 performed three manipulations "insert A", "update to B", and "update to C" in this order on the same record 43a in the master DB 43 will be described as an example. Assume that the first server 21 performed "insert A" and "update to B", and the second server 22 performed "update to C", for example. In addition, assume that the initial values of the record 43a before manipulated by the servers 21 and 22 were empty.

In this case, first, the replica DB creation server 24 determines whether there is a differential record 49 corresponding to the same record 43a of the master DB 43 among the differential records 49 in each of the first difference DB 41 and the second difference DB 42.

Here, when it is determined that there is the differential record 49 corresponding to the same record 43a, the replica DB creation server 24 saves the record 43a in the replica DB 45 to a storage unit of the replica DB creation server 24 (P71). In this example, the replica DB creation server 24 saves the record 43a of which the initial values are empty to the storage unit.

Then, the replica DB creation server 24 identifies the record 43a manipulated last on the basis of the differential records 49 in the first difference DB 41, the differential record 49 in the second difference DB 42, and the state transition 50 (P72).

In this example, three differential records 49 have the "content of manipulation" of "INSERT", "UPDATE", and "UPDATE", respectively. According the state transition 50, the allowable transitions between these manipulations are the transition from "INSERT" to "UPDATE", which is the transition (1), and the transition from "UPDATE" to "UPDATE", which is the transition (2). These two transitions are possible only in the transition "INSERT", "UPDATE", and "UPDATE" in this order.

The order in which the last two "UPDATE" manipulations were performed can be determined from the "pre-manipulation data" and the "post-manipulation data" in the differential records 49. For example, when the "post-manipulation data" of one of two "UPDATE" manipulations is identical to the "pre-manipulation data" of the other, two "UPDATE" manipulations were performed in this order. In the example of FIG. 13, the "update to B" was performed first, and the "update to A" was then performed.

Accordingly, it is possible to identify that the manipulation performed last is update from "B" to "C".

Thereafter, the replica DB creation server 24 stores only the post-manipulation data corresponding to the last manipulated record 43a in the replica DB 45 (P73).

Therefore, even when the servers 21 and 22 manipulated the same record 43a in the master DB 43, only the post-manipulation data in the last manipulation is stored in the replica DB 45, and the consistency of the replica DB 45 is thereby maintained.

It may be considered for the servers 21 and 22 to add a time stamp indicating the time when the record 43a is manipulated to the differential record 49 without using the state transition 50. In this case, the replica DB creation server 24 identifies the differential record 49 corresponding to the last manipulated record 43a by sorting the differential records 49 in the order of the time stamp. However, it is difficult to synchronize the time measured by each of the servers 21 and 22 precisely, and it is impossible for this method to guarantee that the order of the differential records 49 sorted in the order of the time stamp is in the order of time.

By contrast, use of the state transition 50 as in the above example enables to arrange the differential records 49 in the order of time correctly, and the last differential record 49 is correctly identified.

Next, the functional configuration of each device of the information processing system 20 will be described.

Figure 14:
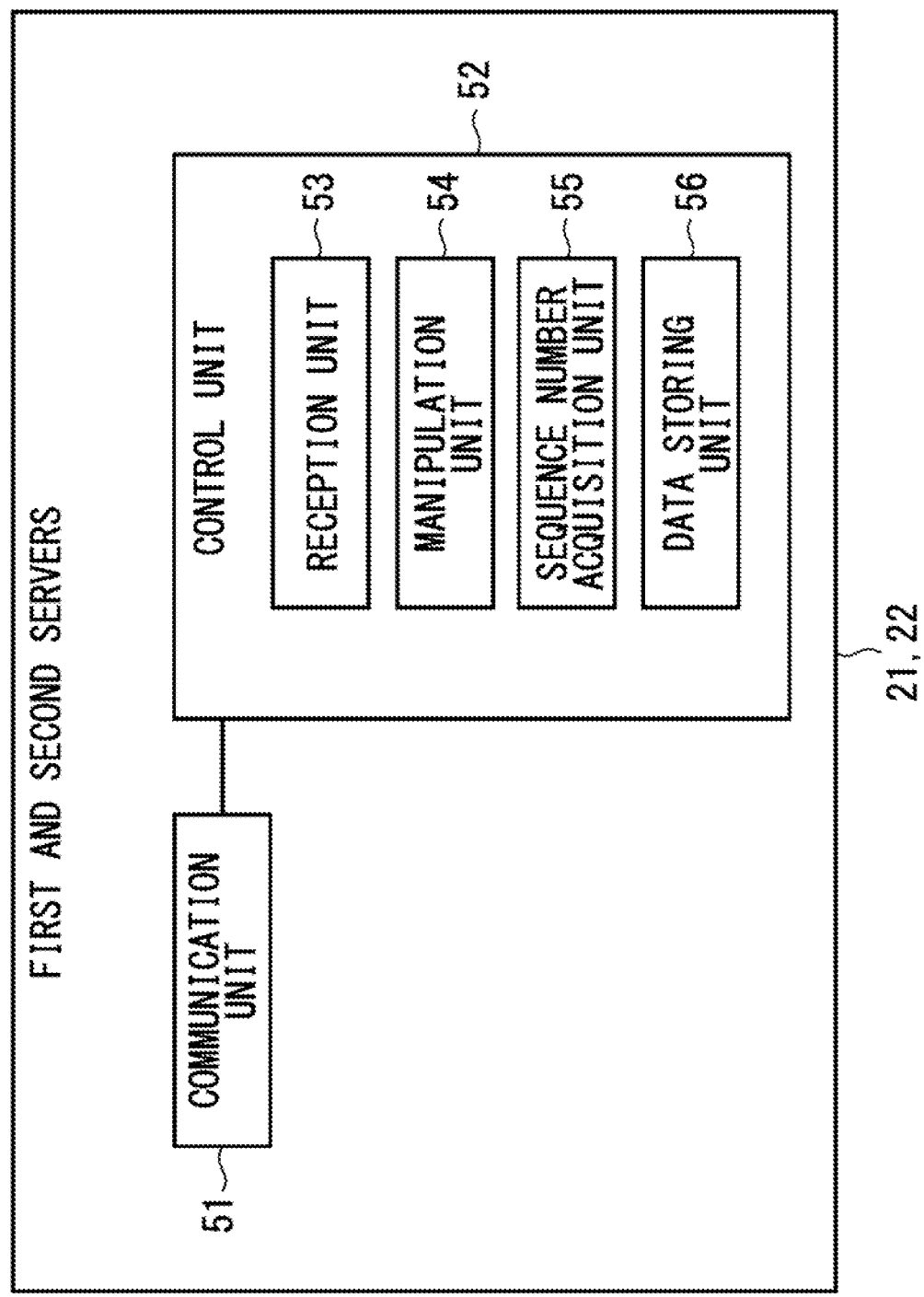
FIG. 14 is a functional block diagram of a first server in accordance with the embodiment.

FIG. 14 is a functional block diagram of the first server 21. As illustrated FIG. 14, the first server 21 includes a communication unit 51 and a control mat 52.

The communication unit 51 is a communication interface for connecting the first server 21 to the network 26.

The control unit 52 is a processing unit that controls each unit of the first server 21, and includes a reception unit 53, a manipulation unit 54, a sequence number acquisition unit 55, and a data storing unit 56.

The reception unit 53 is a processing unit that receives, from the client terminal 25, a manipulation request that requests manipulation of the master DB 43. The manipulation unit 54 is a processing unit that performs manipulations such as insertion, update, and deletion on records in the master DB 43.

The sequence number acquisition unit 55 is a processing unit that acquires the latest sequence number from the first numbering DB 31. The data storing unit 56 is a processing unit that stores the post-manipulation data of the record 43a manipulated by the manipulation unit 54 and the sequence number acquired by the sequence number acquisition unit 55 in the first difference DB 41 in association with each other.

The second server 22 has the same functional configuration as the first server 21 described above. For example, the communication unit 51 of the second server 22 connects the second server 22 to the network 26. The sequence number acquisition unit 55 of the second server 22 acquires the sequence number from the second numbering DB 32. The data storing unit 56 of the second server 22 stores the post-manipulation data of the record 43a and the sequence number in the second difference DB 42 in association with each other.

Figure 15:
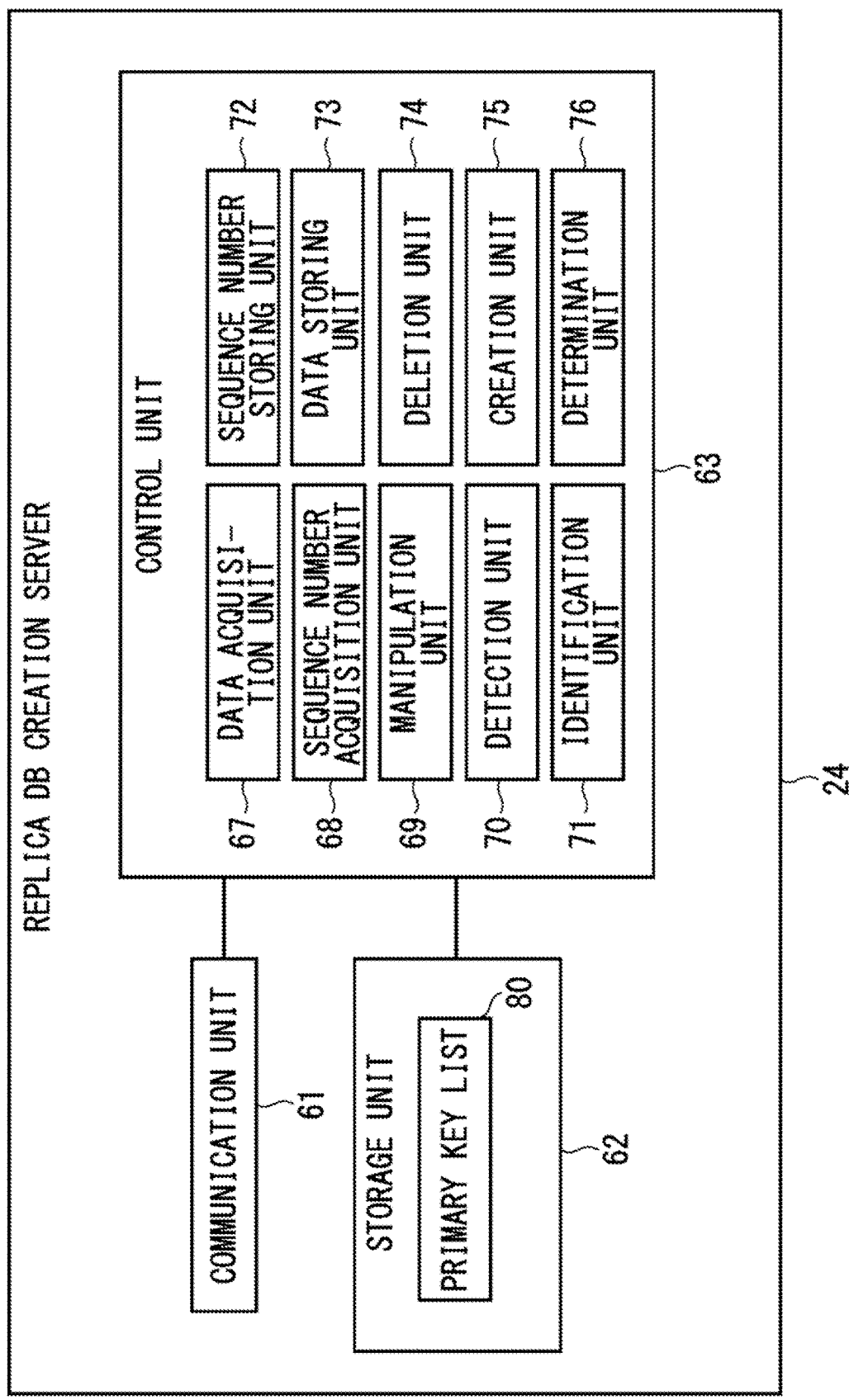
FIG. 15 is a functional block diagram of a replica DB creation server in accordance with the embodiment.

FIG. 15 is a functional block diagram of the replica DB creation server 24.

As illustrated in FIG. 15, the replica DB creation server 24 includes a communication unit 61, a storage unit 62, and a control unit 63.

The communication unit 61 is a communication interface for connecting the replica DB creation server 24 to the network 26. The storage unit 62 stores a primary key list 80. FIG. 16 schematically illustrates the primary key list 80.

The primary key list 80 is information for identifying the record 43a of the master DB 43 manipulated by both the first server 21 and the second server 22. Here, the "table name" and the "primary key" of the record 43a manipulated by both the servers 21 and 22 are stored in the primary key list 80 in association with each other.

For example, consider the database having a table name of "EMPLOYEE LIST". The primary key of this database is the "employee number". In this case, among the records 43a in the database having a table name of "EMPLOYEE LIST" stored in the master DB 43, the record identified by the "employee number" of "1234" was manipulated by both the first server 21 and the second server 22. FIG. 15 is referred to again.

The control unit 63 is a processing unit that controls each unit of the replica DB creation server 24. In this example, the control unit 63 includes a data acquisition unit 67, a sequence number acquisition unit 68, a manipulation unit 69, a detection unit 70, an identification unit 71, and a sequence number storing unit 72. The control unit 63 further includes a data storing, unit 73, a deletion unit 74, a creation unit 75, and a determination unit 76.

The data acquisition unit 67 is a processing unit that acquires the differential records 49 from the first difference DB 41 and the second difference DB 42. The sequence number acquisition unit 68 is a processing unit that acquires the latest sequence number from the first numbering DB 31 and the latest sequence number from the second numbering DB 32.

The manipulation unit 69 is a processing unit that periodically inserts the string "CKPT" into the checkpoint DB 44 by manipulating the checkpoint DB 44 every check period CT. In this example, the manipulation unit 69 inserts the string "CKPT" into the checkpoint DB 44 every check period CT.

The detection unit 70 is a processing, unit that detects that the checkpoint DB is manipulated during the check period CT. As an example, when the manipulation unit 69 inserts the string "CKPT" into the checkpoint DB 44, the detection unit 70 detects that the checkpoint DB 44 is manipulated using a trigger.

The identification unit 71 is a processing unit that identifies the sequence numbers obtained by adding one to the latest sequence numbers in the numbering DBs 31 and 32, by referencing the first numbering DB 31 and the second numbering DB 32 when the detection unit 70 detects the manipulation. In the example of FIG. 10, the identification unit 71 identifies the sequence number "5" obtained by adding one to the latest sequence number "4" in the first numbering DB 31. The identification unit 71 also identifies the sequence number "8" obtained by adding one to the latest sequence number "7" in the second numbering DB 32.

The sequence number storing unit 72 is an example of an identifier storing unit, and is a processing unit that stores the sequence numbers identified by the identification unit 71 in the difference DBs 41 and 42 respectively as the end identifiers indicating the end of the check period CT. In the example of FIG. 10, the sequence number storing unit 72 stores the sequence number "5" as the end identifier in the first difference DB 41 in association with the string "CKPT", and stores the sequence number "8" as the end identifier in the second difference DB 42 in association with the string "CKPT".

The data storing unit 73 is a processing unit that stores the post-manipulation data included in the differential records 49 acquired by the data acquisition unit 67 in the replica DB 45 in ascending order of the sequence number.

The deletion unit 74 is a processing unit that deletes the differential records 49 containing the sequence numbers preceding the respective end identifiers from the differences DB 41 and 42 after the data acquisition unit 67 acquires the differential records 49. For example, in the case of FIG. 10, the deletion unit 74 deletes, from the first difference DB 41, the differential records 49 containing the sequence numbers "1" to "4" preceding the end identifier "5" in the first difference DB 41. Similarly, the deletion unit 74 deletes, from the second difference DB 42, the differential records 49 containing the sequence numbers "5" to "7" preceding the end identifier "8" in the second difference DB 42.

The creation unit 75 is a processing unit that creates the primary key list 80 in the storage unit 62. The determination unit 76 determines whether there is the differential record 49 corresponding to the record 43a manipulated by both the first server 21 and the second server 22 among the differential records 49 acquired by the data acquisition unit 67 by referencing the primary key list 80.

Note that the replica DB creation server 24 is provided separately from the first and second servers 21 and 22 in this example, but either the server 21 or 22 may have the functions of the replica DB creation server 24 as described above. For example, the control unit 52 of the first server 21 may have the functions of the control unit 63 of the replica DB creation server 24, and the first server 21 may have the function of the storage unit 62 of the replica DB creation server 24.

Figure 17:
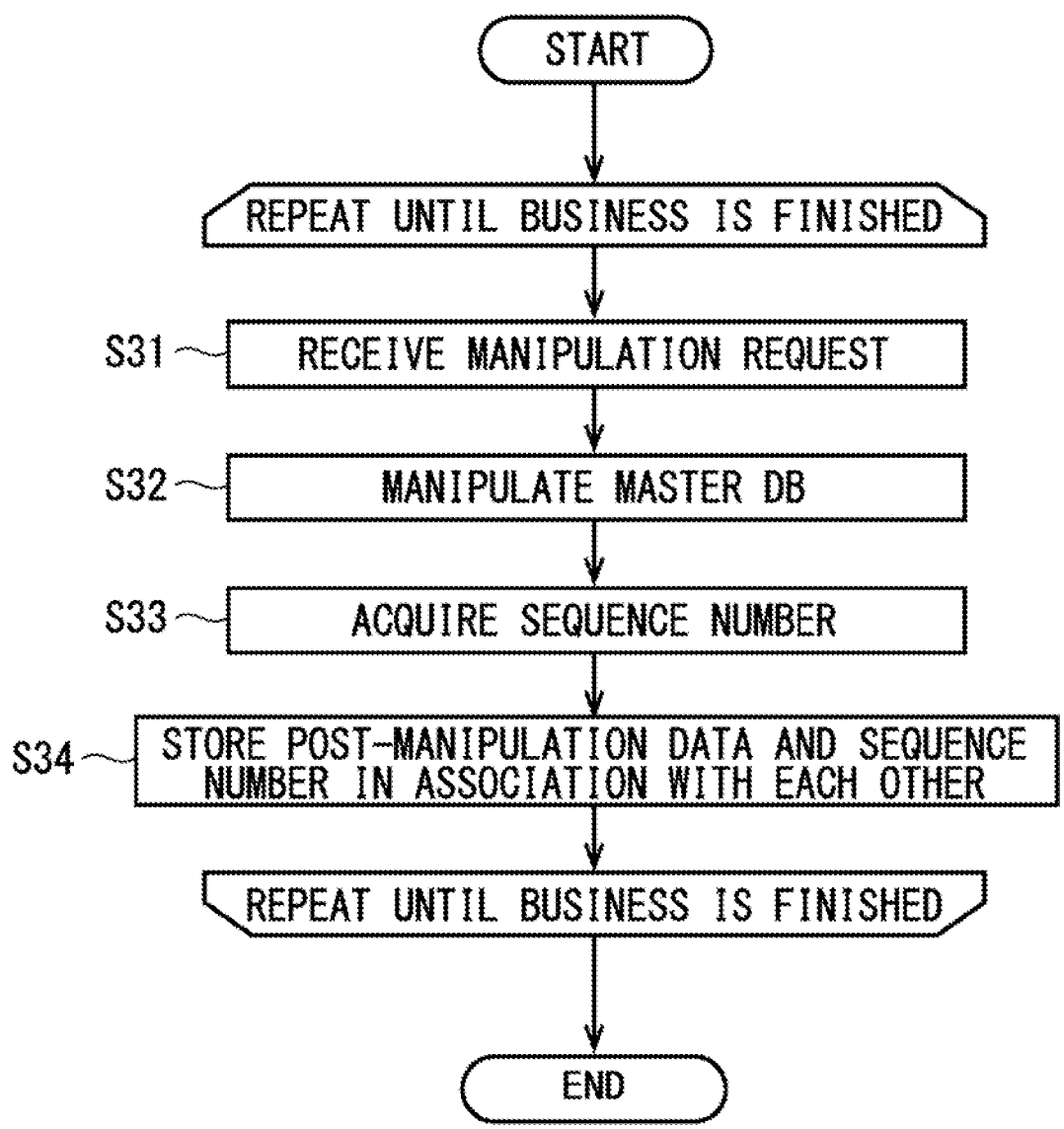
FIG. 17 is a flowchart of a process executed by the first server in accordance with the embodiment.

Next, the information processing method in accordance with the embodiment will be described. FIG. 17 is a flowchart of a process executed by the first server 21.

First, the reception unit 53 of the first server 21 receives a manipulation request that requests a manipulation of the master DB 43, from the client terminal 25 (step S31).

Then, the manipulation unit 54 manipulates the record 43a of the master DB 43 according to the manipulation request (step S32). For example, when the manipulation request requests update of the record 43a, the manipulation unit 54 updates the record 43a.

Then, the sequence number acquisition unit 55 detects that the record 43a has been manipulated using, for example, a trigger, and acquires the latest sequence number from the first numbering DB 31 with the detection as a trigger (step S33).

Thereafter, the data storing unit 56 stores the differential record 49 in which the post-manipulation data of the record 43a detected by the trigger and the sequence number acquired in step S33 are associated with each other in the first difference DB 41 (step S34).

At this time, the data storing unit 56 also stores the "data type", the "table name", the "primary key", the "content of manipulation", and the "pre-manipulation data" in the first difference DB 41 in association with the sequence number as illustrated in FIG. 9.

In this example, the string "DB", indicates that the master DB 43 has been manipulated, is stored in the "data type". The table name of the manipulated database, such as "EMPLOYEE LIST", is stored in the "table name". The attribute uniquely identifying the manipulated record 43a is stored in the "primary key". In the case of "EMPLOYEE LIST" the attribute "employee number" is the primary key. The "INSERT", "UPDATE", or "DELETE", which is the manipulation performed on the record 43a, is stored in the "content of manipulation". The data of the record 43a before manipulation is stored in the "pre-manipulation data".

Thereafter, steps S31 to S34 are repeated until the business of the first server 21 is finished.

The second server 22 also executes steps S31 to S34 in the same manner as the first server 21.

Figure 18:
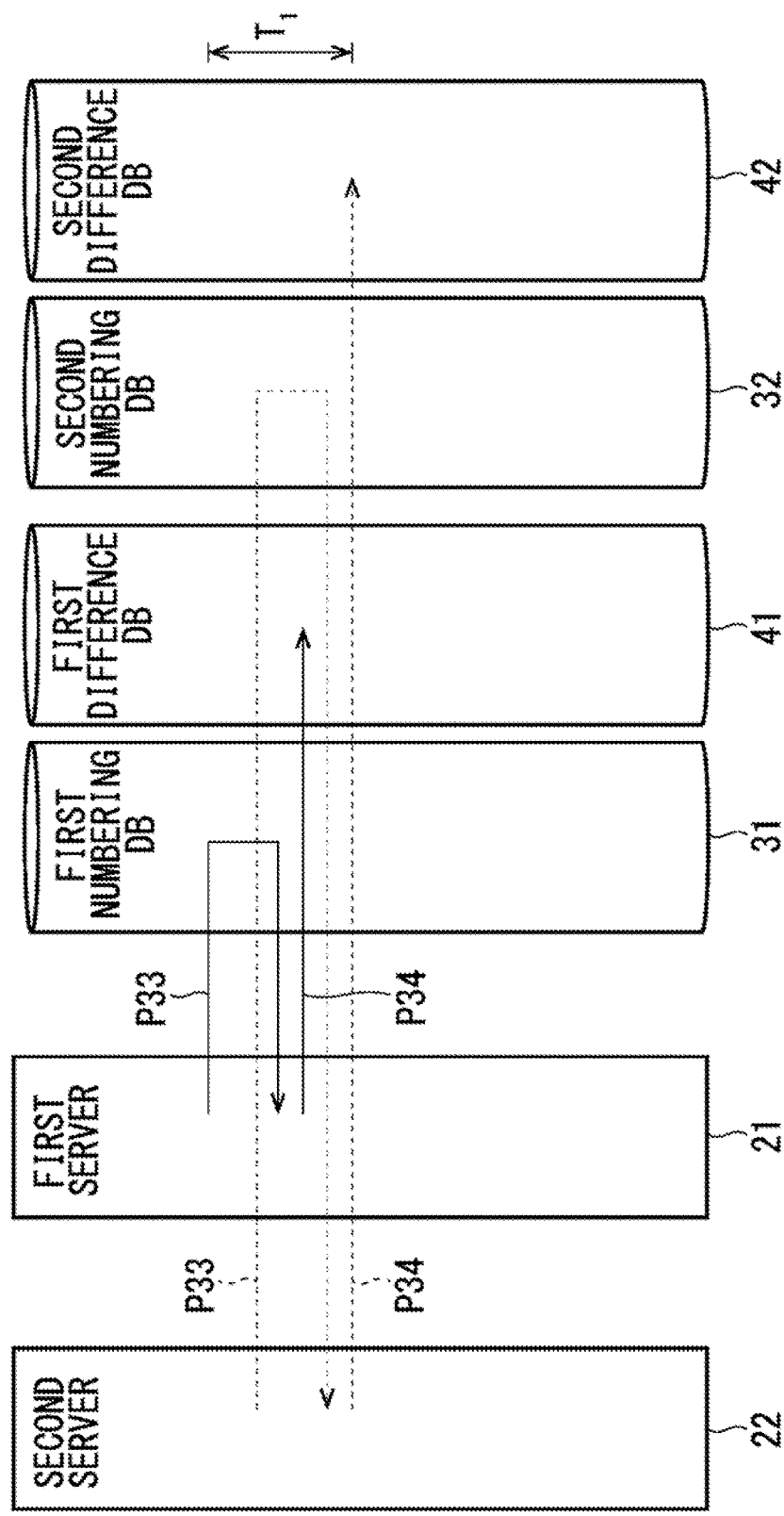
FIG. 18 schematically illustrates how each server accesses a corresponding numbering DB and a corresponding difference DB.

FIG. 18 schematically illustrates a case where the servers 21 and 22 access the numbering DBs 31 and 32 and the difference DBs 41 and 42, respectively according to the flowchart of FIG. 17.

As illustrated in FIG. 18, in the present embodiment the first numbering DB 31 and the first difference DB 41 accessed by the first server 21 are separated from the second numbering DB 32 and the second difference DB 42 accessed by the second server 22, respectively. Therefore, even when step S33 in which the first server 21 accesses the first numbering DB 31 and step 33 in which the second server 22 accesses the second numbering DB 32 are not executed exclusively, the consistency of each of the numbering DBs 31 and 32 is maintained. Similarly, even when step 34 of the server 21 and step 33 of the server 22 are not executed exclusively, the consistency of each of the difference DBs 41 and 42 is maintained.

As a result, the response time $T_1$ from the execution of step S33 by the first server 21 to the completion of step S34 by the second server 22 becomes less than the response time $T_0$ in FIG. 4.

Next, the information processing method performed by the replica DB creation server 24 will be described. The information processing method performed by the replica DB creation server 24 includes a process for manipulating the checkpoint DB 44 and a process for creating the replica DB 45.

The information processing method when manipulating the checkpoint DB 44 will be described first.

Figure 19:
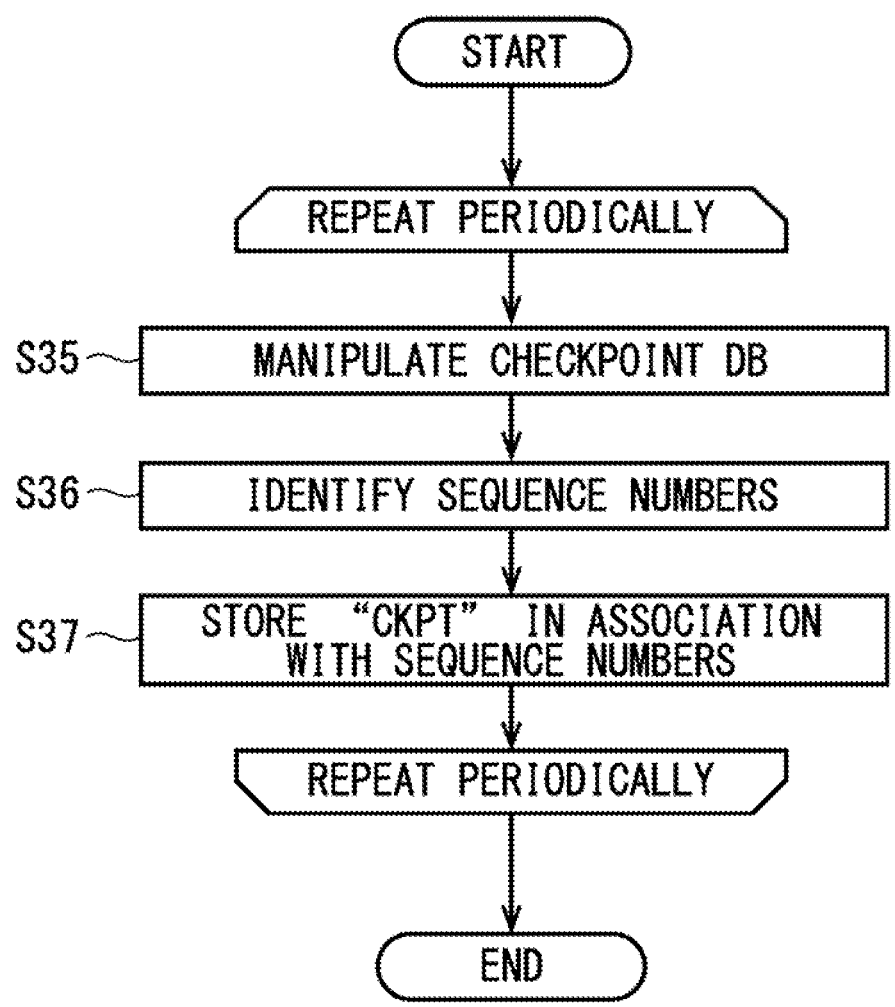
FIG. 19 is a flowchart of an information processing method executed by the replica DB creation server in accordance with the embodiment when the checkpoint DB is manipulated.

FIG. 19 is a flowchart of the information processing method performed by the replica DB creation server 24 when manipulating, the checkpoint DB 44.

First, the manipulation unit 69 inserts the string "CKPT" into the checkpoint DB 44 by manipulating the checkpoint DB 44 (step S35).

Then, the detection unit 70 detects that the checkpoint DB 44 has been manipulated, and the identification unit 71 identifies the sequence number obtained by adding one to the latest sequence number in the numbering DB 31, and the sequence number obtained by adding one to the latest sequence number in the numbering DB 32, with the detection as a trigger (step S36).

Then, the sequence number storing unit 72 stores the sequence numbers identified by the identification unit 71 in the difference DBs 41 and 42, respectively as the end identifiers indicating the end of the check period CT (step S37). At this time, the sequence number storing unit 72 stores the end identifiers in the difference DBs 41 and 42 in association with the string "CKPT" as in P57 of FIG. 10.

Thereafter, steps S35 to S37 are repeated once per check period CT.

This completes the basic processing of the information processing method performed by the replica DB creation server 24 when manipulating the checkpoint DB 44.

Figure 20:
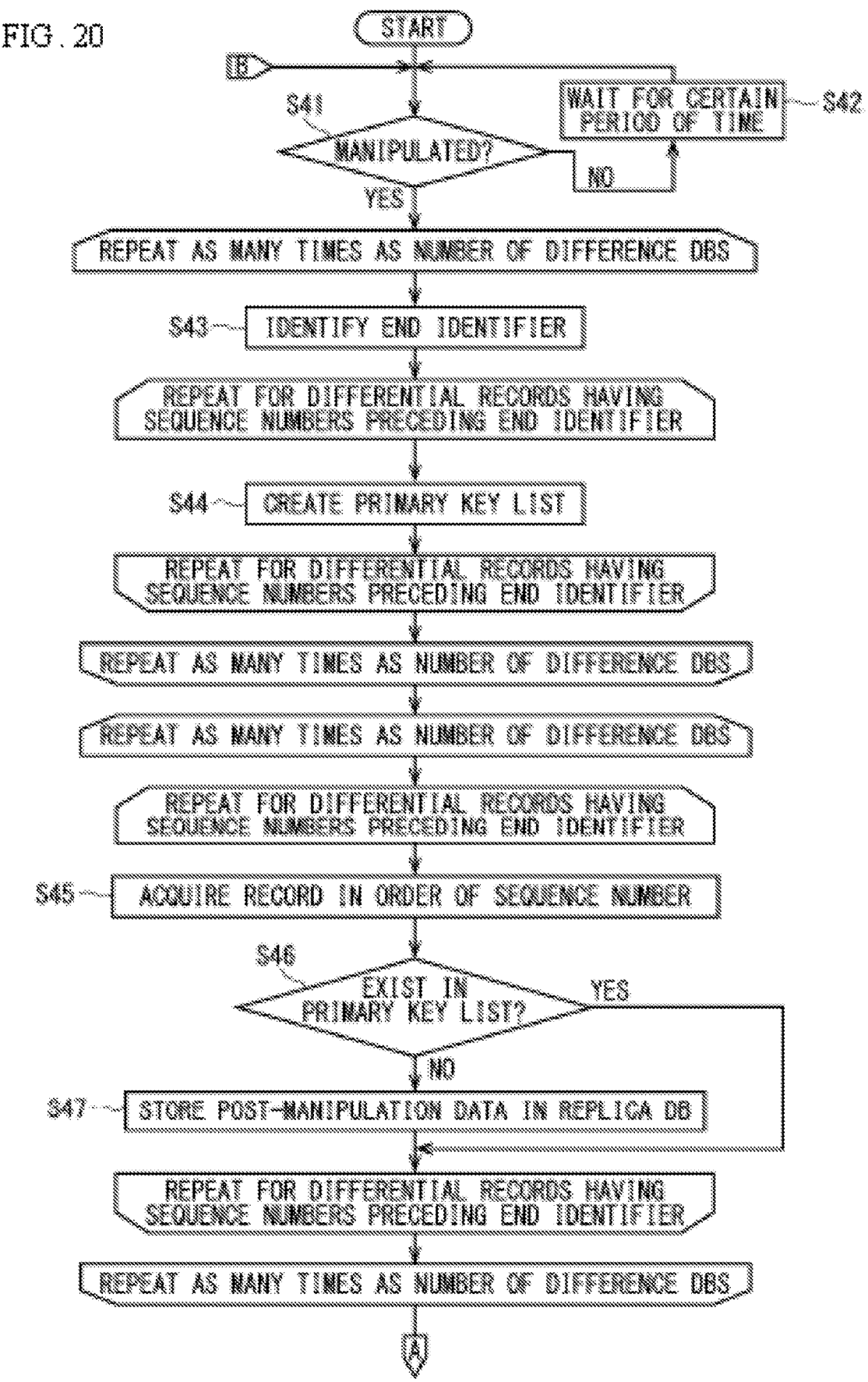
FIG. 20 is a flowchart (No. 1) of an information processing method executed by the replica DB creation server in accordance with the embodiment when the replica DB is created.
Figure 21:
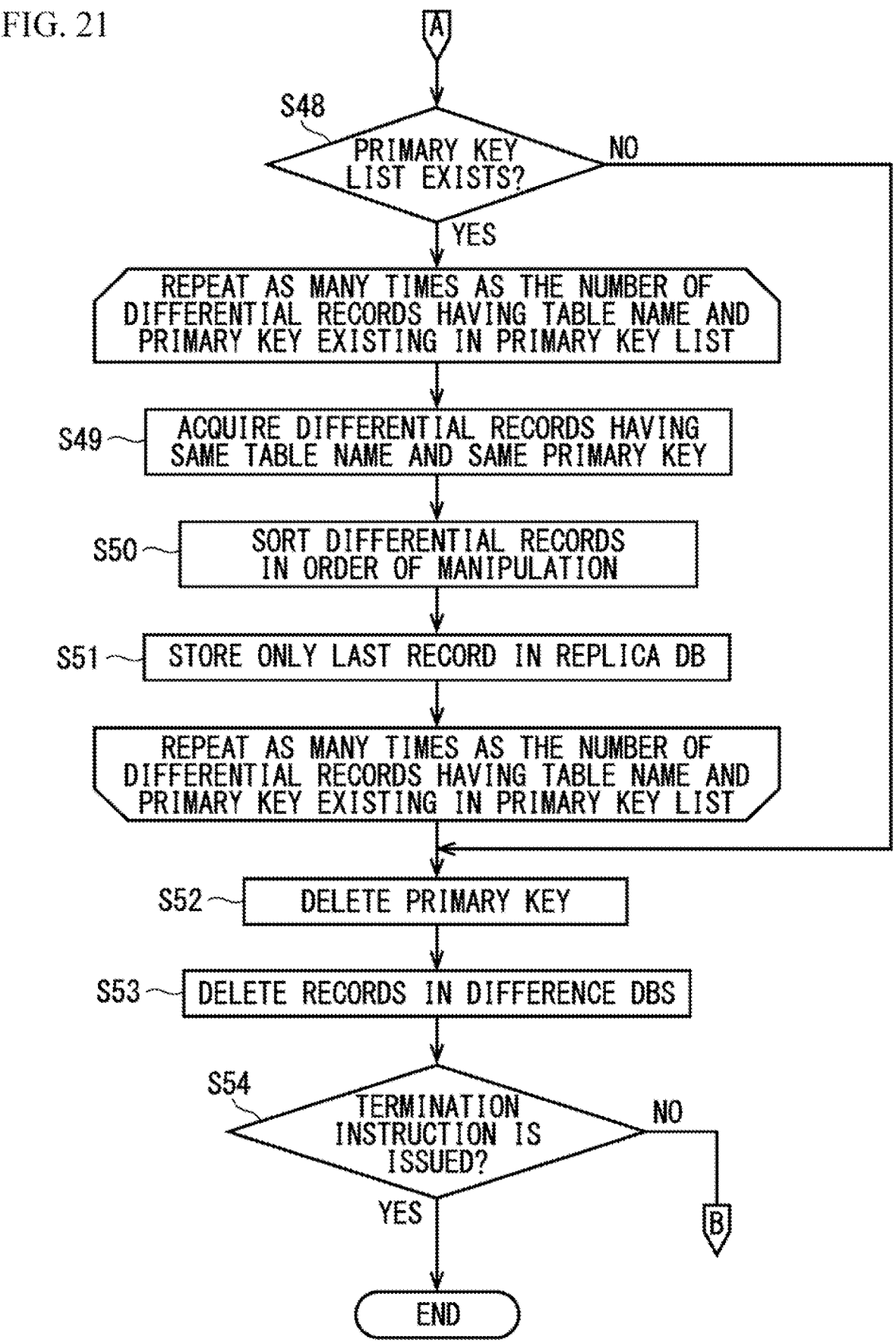
FIG. 21 a flowchart (No. 2) of the information processing method executed by the replica DB creation server in accordance with the embodiment when the replica DB is created.

Next, the information processing method when creating the replica DB 45 will be described. FIG. 20 and FIG. 21 are flowcharts of the information processing method performed by the replica DB creation server 24 when creating the replica DB 45.

This information processing method is implemented by the replica DB creation server 24 executing the information processing program described later, and is started when the administrator starts the in processing program.

First, the detection unit 70 detects whether the checkpoint DB 44 is manipulated (step S41). For example, the detection unit 70 detects that the checkpoint DB 44 is manipulated when the manipulation unit 69 inserts the string "CKPT" into the checkpoint DB 44.

When the checkpoint DB 44 is not manipulated (step S41: NO), the process proceeds to step S42. In step S42, the replica DB creation server 24 waits for a certain period of time, and then returns to step S41.

When the checkpoint DB 44 is manipulated (step S41 YES), the process proceeds to step S43.

In step S43, the identification unit 71 identifies the end identifier obtained by adding one to the latest sequence number in the first numbering DB 31. Step S43 is repeated as many times as the member of the numbering DBs 31 and 32. Thus, in step S43, the identification unit 71 also identifies the end identifier obtained by adding one to the latest sequence number in the second numbering DB 32.

Then, the creation unit 75 acquires the differential records 49 having the sequence numbers preceding the corresponding end identifier from each of the difference DBs 41 and 42, and creates the primary key list 80 from these differential records 49, in the storage unit 62 (step S44). For example, among the differential records 49 in the first difference DB 41, the creation unit 75 identifies the record having the "primary key" and the "table name" identical to those of the differential record 49 in the second difference DB 42. Then, the creation unit 75 stores the "primary key", the "table name", and the "pre-manipulation data" of the identified differential record 49, in the primary key list 80 of the storage unit 62.

This causes the differential records 49 corresponding to the record 43*a* manipulated by both the first server 21 and the second server 22 to be saved to the storage unit 62 as in P71 of FIG. 13.

Then, the data acquisition unit 67 acquires the differential record 49 having the sequence number preceding the end identifier from the first difference DB 41 in order of the sequence number (step S45). Step S45 is executed for each difference DB 41, 42. Thus, the data acquisition unit 67 acquires the differential record 49 in the second difference DB 42 in the same manner.

Furthermore, in this example, when there is a manipulation of the checkpoint DB 44 executed only once during the check period CT (step S41: YES), step S45 is executed. Therefore, the data acquisition unit 67 acquires the differential records 49 of which the order precedes the end identifier as the differential records 49 corresponding to the records 43*a* manipulated in the check period.

Then, the determination unit 76 determines whether the "table name" and the "primary key" of the differential record 49 acquired in step S45 exists in the primary key list 80 (step S46). When it is determined that the "table name" and the "primary key" of the differential record 49 acquired in step S45 do not exist in the primary key list 80 (step S46: NO), the process proceeds to step S47.

In step S47, the data storing unit 73 stores the post-manipulation data contained in the differential record 49 acquired in step S45 in the replica DB 45. Steps S45 to S47 are performed for the differential records 49 having the sequence numbers preceding the end identifier acquired in the step S43 in order of the sequence number. Accordingly, the data storing unit 73 stores the post-manipulation data in the replica DB 45 in order of the sequence number.

When it is determined that the "table tame" and the "primary key" of the differential record 49 exist in the primary key list 80 in step S46 (step S46: YES), this means that the record 43*a* corresponding to the differential record 49 was manipulated from both the servers 21 and 22. On this case, as illustrated in FIG. 13, it is necessary to store, in the replica DB 45, only the post-manipulation data of the differential record 49 corresponding to the last manipulation among the manipulations performed on the record 43*a* therefore, step S47 is skipped.

Then, the determination unit 76 determines whether the key list 80 exists in the storage unit 62 (step S48).

When it is determined that the primary key list 80 exists (step S48: YES), this means that there is the record 43*a* of the master DB 43 manipulated by both the first server 21 and the second server 22. In this case, as described with reference to FIG. 13, the differential record 49 corresponding to the last manipulated record 43*a* is identified on the basis of the state transition 50.

First, the data acquisition unit 67 acquires, from the difference DBs 41 and 42, the differential records 49 of which the "table name" and the "primary key" exist in the primary key list 80 among the differential records 49 in the difference DBs 41 and 42 (step S49). Each of the differential records 49 acquired as described above stores the post-manipulation data when each server 21, 22 manipulated the same record 43*a*.

Then, the data storing unit 73 sorts the differential records 49 in order of the manipulations using the state transition 50 illustrated in FIG. 11 to identify the differential record 49 corresponding to the last manipulated record 43*a* (step S50). As an example, the data storing unit 73 sorts the differential records 49 so that the "content of manipulation", the "pre-manipulation data", and the "post-manipulation data" of the differential records 49 are consistent with the state transition 50. The data storing unit 73 then identifies the differential record 49 arranged in the last as the differential record 49 corresponding to the last manipulated record 43*a*.

As described with reference to FIG. 13, by sorting the differential records 49 using the state transition 50 as described above, the last differential record 49 can be accurately identified without using a time stamp.

Then, the data storing unit 73 stores only the post-manipulation data of the last differential record 49 identified in step S50 among the differential records 49 acquired in step S49, in the replica DB 45 (step S51).

Then, the creation unit 75 deletes the primary key list 80 from the storage unit 62 (step S52). When it is determined that no primary key list 80 exists in the storage unit 62 in step S48, the primary key list 80 is deleted.

Then, the deletion unit 74 deletes the differential records 49 containing the sequence numbers preceding the corresponding end identifier from each of the difference DBs 41 and 42 (step S53). In the example of FIG. 10, the deletion unit 74 deletes the differential records 49 containing, the sequence numbers "1" to "4" preceding "5", which is the end identifier in the first difference DB 41. The deletion unit 74 also deletes the differential records 49 containing the sequence numbers "5" to "7" preceding "8", which is the end identifier in the second difference DB 42.

Then, the determination unit 76 determines whether the administrator issues the instruction to terminate the execution of the information processing program (step S54). When no instruction is issued (step S54: NO), the process returns to step S41.

When the instruction is issued (step 4: YES), the process is terminated.

This completes the basic processing of the information processing method performed by the replica DB creation server 24.

In the embodiment described above, as illustrated in FIG. 18, the first and second numbering DBs 31 and 32 are provided so as to correspond to the first and second servers 21 and 22, respectively. In the present embodiment, since the first and second difference DBs 41 and 42 are provided so as to correspond to the servers 21 and 22, respectively, the response time $T_1$ is reduced.

In addition, in step S47 of FIG. 20, the data storing unit 73 stores the post-manipulation data in the replica DB 45 in order of the sequence number. This guarantees the consistency of the replica DB 45 because the post-manipulation data is stored in the replica DB 45 in order of manipulations.

Furthermore, when there is the differential record 49 for the same record 43*a* in both the difference DBs 41 and 42, the data storing unit 73 stores only the post-manipulation data of the differential record 49 corresponding to the last manipulated record 43*a*, in the replica DB 45 in step S51. Thus, even when both the first server 21 and the second server 22 manipulated the e record 43a, the consistency of the replica DB 45 can be maintained.

Furthermore, since the manipulation unit 69 manipulates the checkpoint DB 44 every check period CT, determination in step S41 becomes YES every check period CT, and step S47 is executed. As a result, in step S47, the data storing unit 73 can store the post-manipulation data of the records 43a manipulated in the check period CT collectively in the replica DB 45.

Hardware Configuration

Figure 22:
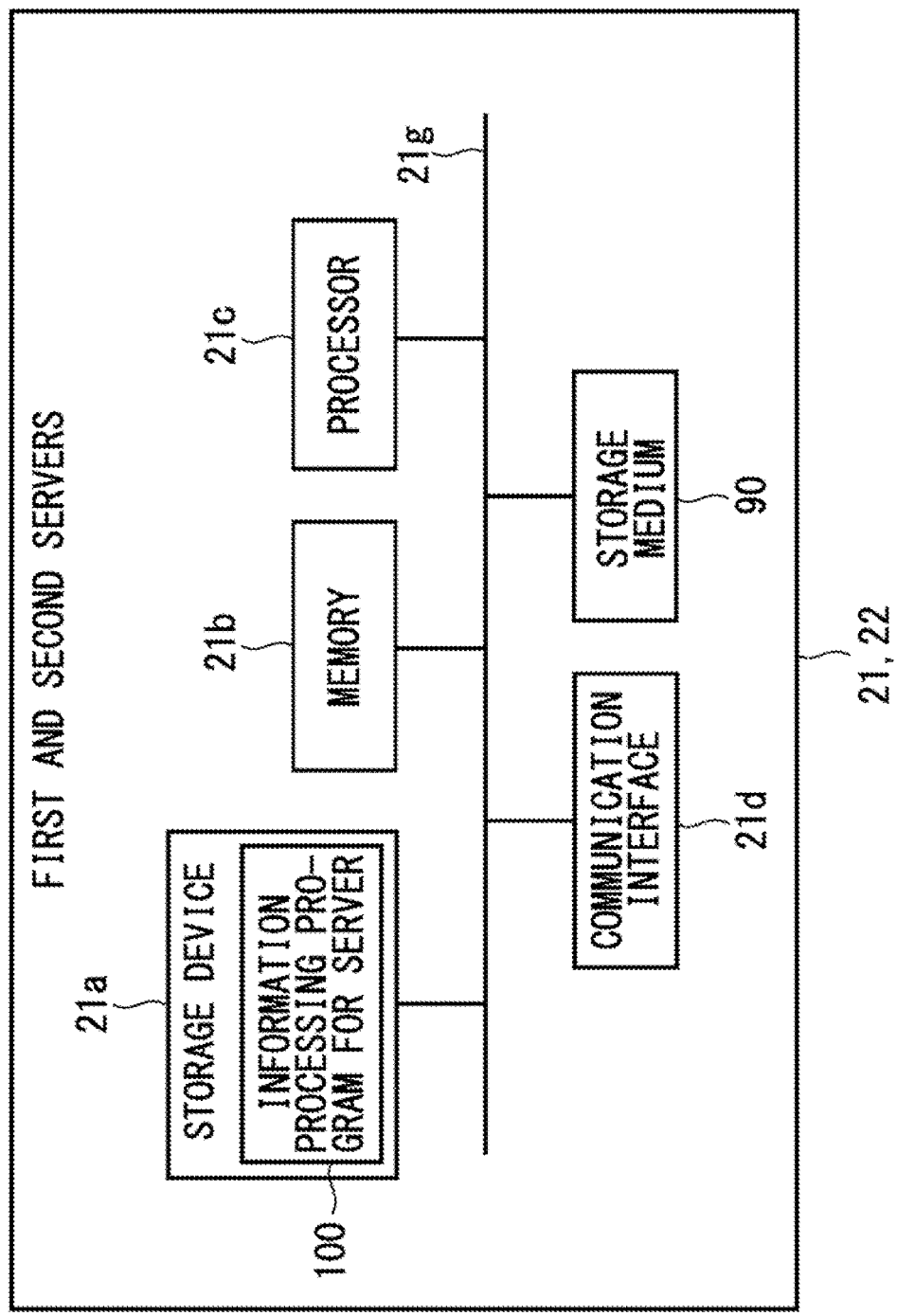
FIG. 22 is a hardware configuration diagram of the first server and the second server in accordance with the embodiment.

FIG. 22 illustrates a hardware configuration of the first server 21 and the second server 22 in accordance with the embodiment.

As illustrated in FIG. 22, each of the servers 21 and 22 includes a storage device 21a, a memory 21b, a processor 21c, and a communication interface 21d. These components are interconnected through a bus 21g.

The storage device 21a is a non-volatile storage such as an HDD or an SSD, and stores an information processing program 100 for each server 21, 22 in accordance with the embodiment.

The information processing program 100 may be stored in a computer-readable storage medium 90, and the processor 21c may read the information processing program 100 in the storage medium 90.

Examples of the storage medium 90 include a physical portable storage medium such as a compact disc-read only memory (CD-ROM) a digital versatile disc (DVD), and a universal serial bus (USB) memory. Alternatively, a semiconductor memory such as a flash memory or a hard disk drive may be used as the storage medium 90. These storage media 90 are not temporal storage media such as carrier waves that have no physical form.

Yet alternatively, the information processing program 100 may be stored in a device connected to a public network, the Internet, or a local area network (LAN). In this case, the processor 21c may read the information processing program 100 and execute it.

The memory 21b is a hardware device, such as a dynamic random-access memory (DRAM), that temporarily stores data, and the information processing program 100 is expanded on the memory 21b.

The processor 21c is a hardware device such as a central processing unit (CPU) or a graphical processing unit (GPU), and executes the information processing program 100 in cooperation with the memory 21b.

The control unit 52 of FIG. 14 is implemented by the memory 21b and the processor 21c cooperatively executing the information processing program 100. The control unit 52 includes the processing units including the reception unit 53, the manipulation unit 54, the sequence number acquisition unit 55, and the data storing unit 56.

The communication interface 21d is a communication interlace such as network interface card (NIC) for connecting the servers 21 and 22 to the network 26 (see FIG. 5). The communication unit 51 of FIG. 14 is implemented by the communication interface 21d.

Figure 23:
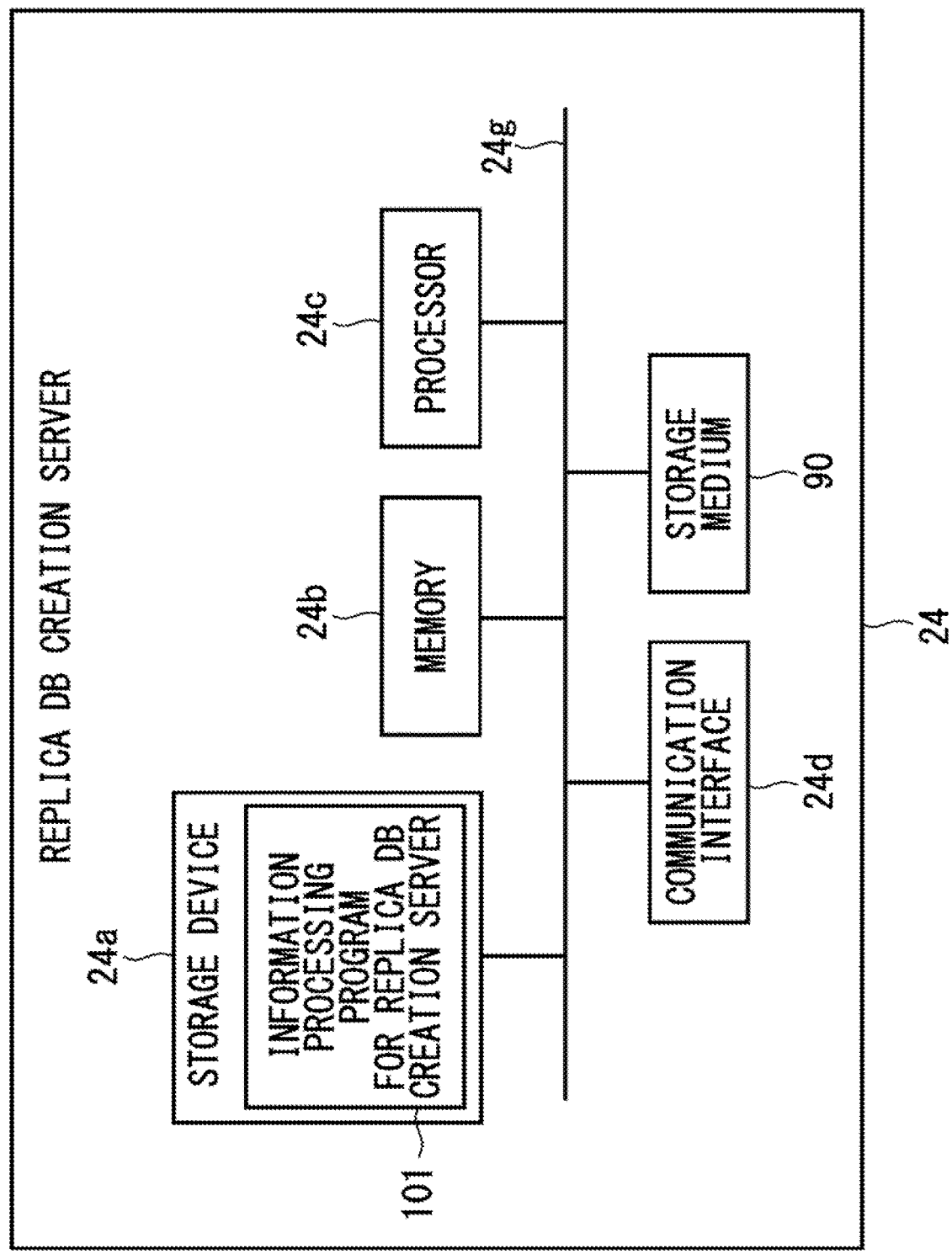
FIG. 23 is a hardware configuration diagram of the replica DB creation server in accordance with the embodiment.

FIG. 23 is a hardware configuration diagram of the replica DB creation server 24 in accordance with the embodiment.

As illustrated in FIG. 23, the replica DB creation server 24 includes a storage device 24a, a memory 24b, a processor 24e, and a communication interface 24d. These components are interconnected through a bus 24g.

The storage device 24a is a non-volatile storage such as an HDD or an SSD, and stores an information processing program 101 for the replica DB creation server 24 in accordance with the embodiment.

Note that the information processing program 101 may be stored in a computer-readable storage medium 90, and the processor 21c may be caused to read the information processing program 101 in the storage medium 90.

The information processing program 101 may be stored in a device connected to a public network, the Internet, or a LAN, and the processor 24c may read the information processing program 101 and execute it.

The memory 24b is a hardware device, such as a DRAM, that temporarily stores data, and the information processing program 101 is expanded on the memory 24b.

The processor 24c is a hardware device such as a CPU and a GPU that controls each unit of the replica DB creation server 24. The processor 24c executes the information processing program 101 in cooperation with the memory 24b.

The control unit 63 of FIG. 15 is implemented by the memory 24b and the processor 24c cooperatively executing the information processing program 101. The control unit 63 includes the processing units including the data acquisition unit 67, the sequence number acquisition unit 68, the manipulation unit 69, the detection unit 70, the identification unit 71, the sequence number storing unit 72, the data storing unit 73, the deletion unit 74, the creation unit 75, and the determination unit 76.

The storage unit 62 of FIG. 15 is implemented by the storage e 24a and the memory 24b.

The communication interface 24d is a communication interface such as an NIC for connecting the replica DB creation server 24 to the network 26 (see FIG. 5). The communication unit 61 of FIG. 15 is implemented by the communication interface 24d.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples m the specification relate to a showing of the superiority and inferiority of the invention. Although the embodiments of the present invention have been described detail, it should be understood that the various change, substitutions, and alterations could be made hereto without departing from the spirit and scope of the invention.

What is claimed is:

1. An information processing device comprising:
a memory; and
a processor coupled to the memory and configured to:
acquire first data from a first database corresponding to a first server that manipulates records in a second database, where the first database stores, in association with a first identifier, second data, which are a first piece of manipulated data of data of a first record of the records in a first manipulation performed by the first server, the first data are the second data stored in the first database in a first period, the first identifier indicates order of the first manipulation, and the first record is stored in the second database;
acquire third data from a third database, which is different from the first database and corresponds to a second server that is different from the first server and manipulates the records in the second database, where the second database stores, in association with a second identifier independent from the first identifier, fourth data, which are a second piece of manipulated data of data of a second record of the records in a second manipulation performed by the second server, the third data are the fourth data stored in the third database in the first period, the second identifier indicates order of the second manipulation, and the second record is stored in the second database; and store the first data, which is in the first database, in a fourth database in order indicated by the first identifier and the third data, which is in the third database, in the fourth database in order indicated by the second identifier, the first identifier is managed in a fifth database corresponding to the first server, and the second identifier is managed in a sixth database that is different from the fifth database and corresponds to the second server.

2. The information processing device according to claim 1, wherein the storing of the first data and the third data in the fourth database includes storing data after a manipulation performed last of the first manipulation and the second manipulation, in the fourth database when the first record and the second record are a same record.

3. The information processing device according to claim 2, wherein:

the first database stores the first identifier, the first data, a content of the first manipulation, and data of the first record before the first manipulation in association with each other, the third database stores the second identifier, the third data, a content of the second manipulation, and data of the second record before the second manipulation in association with each other, the processor is further configured to identify the data after the manipulation performed last, based on the first data and the third data that are acquired, the content of the first manipulation, the data before the first manipulation, the content of the second manipulation, the data before the second manipulation, and an allowable state transition between the first manipulation and the second manipulation.

4. The information processing device according to claim 1, wherein the processor is further configured to:

detect that a seventh database is manipulated in the first period, when detecting that the seventh database is manipulated, identify a third identifier obtained by adding one to a latest first identifier in the fifth database, when detecting that the seventh database is manipulated, identify a fourth identifier obtained by adding one to a latest second identifier in the sixth database, store the third identifier as a first end identifier indicating an end of the first period in the fifth database, store the fourth identifier as a second end identifier indicating the end of the first period in the sixth database, and delete the first data associated with the first identifier preceding the first end identifier from the first database after the acquiring of the first data, delete the third data associated with the second identifier preceding the second end identifier from the third database after the acquiring of the third data, wherein the second data stored in the first period is the second data associated with the first identifier preceding the first end identifier, wherein the fourth data stored in the first period is the fourth data associated with the second identifier preceding the second end identifier.

5. The information processing device according to claim 4, the processor is configured to manipulate the seventh database every the first period.

6. An information processing system comprising:
an information processing device;
a first database;
a first server that manipulates records in the first database; and
a second server that is different from the first server and manipulates the records in the first database,
the first server includes:
  a first memory, and
  a first processor coupled to the first memory and configured to:
    perform a first manipulation on a first record containing first data of the records stored in the first database, and
    store second data, which is a first piece of manipulated data of the first data in the first manipulation, in a second database in association with a first identifier, where the second database corresponds to the first server, where the first identifier indicates order of the first manipulation,
the second server includes:
  a second memory, and
  a second processor coupled to the second memory and configured to:
    perform a second manipulation on a second record containing third data of the records stored in the first database, and
    store fourth data, which is a second piece of manipulated data of the third data in the second manipulation, in a third database in association with a second identifier independent from the first identifier, where the third database is different from the second database and corresponds to the second server, where the second identifier indicates order of the second manipulation,
the information processing device includes:
  a third memory, and
  a third processor coupled to the third memory and configured to:
    acquire fifth data from the second database and sixth data from the third database, where the fifth data are the second data stored in the second database in a first period, and the sixth data are the fourth data stored in the third database in the first period, and
    store the fifth data, which is in the second database, in a fourth database in order indicated by the first identifier and the sixth data, which is in the third database, in the fourth database in order indicated by the second identifier,
the first identifier is managed in a fifth database corresponding to the first server, and the second identifier is managed in a sixth database that is different from the fifth database and corresponds to the second server.

7. The information processing system according to claim 6, wherein the storing of the fifth data and the sixth data in the fourth database includes storing data after a manipulation performed last of the first manipulation and the second manipulation when the first record and the second record are a same record.

8. The information processing system according to claim 7, wherein:
the first processor is further configured to store the first identifier, the first data after the first manipulation, a content of the first manipulation, and data of the first record before the first manipulation, in the second database, in association with each other, the second processor is further configured to store the second identifier, the third data after the second manipulation, a content of the second manipulation, and data of the second record before the second manipulation, in the third database, in association with each other, and the third processor is further configured to identify the data after the manipulation performed last, based on the fifth data and the sixth data that are acquired, the content of the first manipulation, the data before the first manipulation, the content of the second manipulation, the data before the second manipulation, and an allowable state transition between the first manipulation and the second manipulation.

9. A non-transitory computer-readable recording medium storing an information processing program that causes a computer to execute a process, the process including acquiring first data from a first database corresponding to a first server that manipulates records in a second database, where the first database stores, in association with a first identifier, second data, which is a first piece of manipulated data of data of a first record of the records in a first manipulation performed by the first server, the first data are the second data stored in the first database in a first period, the first identifier indicates order of the first manipulation, and the first record is stored in the second database;

acquiring third data from a third database, which is different from the first database and corresponds to a second server that is different from the first server and manipulates the records in the second database, where the third database stores, in association with a second identifier independent from the first identifier, fourth data, which are a second piece of manipulated data of data of a second record of the records in a second manipulation performed by the second server, the third data are the fourth data stored in the third database in the first period, the second identifier indicates order of the second manipulation, and the second record is stored in the second database; and storing the first data, which is in the first database, in a fourth database in order indicated by the first identifier and the third data, which is in the third database, in the fourth database in order indicated by the second identifier, the first identifier is managed in a fifth database corresponding to the first server, and the second identifier is managed in a sixth database that is different from the fifth database and corresponds to the second server.

10. The non-transitory computer-readable recording medium according to claim 9, wherein the storing of the first data and the third data in the fourth database includes storing data after a manipulation performed last of the first manipulation and the second manipulation in the fourth database when the first record and the second record are a same record.

11. The non-transitory computer-readable recording medium according to claim 10, wherein:

the first database stores the first identifier, the first data, a content of the first manipulation, and data of the first record before the first manipulation in association with each other, the third database stores the second identifier, the third data, a content of the second manipulation, and data of the second record before the second manipulation in association with each other, the storing of the first data and the third data in the fourth database includes identifying the data after the manipulation performed last, based on the first data and the third data that are acquired, the content of the first manipulation, the data before the first manipulation, the content of the second manipulation, the data before the second manipulation, and an allowable state transition between the first manipulation and the second manipulation.

\* \* \* \* \*